(12) United States Patent
Monaco

(10) Patent No.: US 6,434,523 B1
(45) Date of Patent: Aug. 13, 2002

(54) CREATING AND EDITING GRAMMARS FOR SPEECH RECOGNITION GRAPHICALLY

(75) Inventor: Peter C. Monaco, Mt. View, CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/299,173

(22) Filed: Apr. 23, 1999

(51) Int. Cl.[7] .......................... G10L 15/06; G10L 15/22
(52) U.S. Cl. ...................... 704/257; 704/270; 704/243
(58) Field of Search ................................. 704/230–235, 704/243–245, 255–257, 270, 275, 276, 278; 345/348, 349; 707/5, 100, 103

(56) References Cited

U.S. PATENT DOCUMENTS

| | | | |
|---|---|---|---|
| 5,544,305 A | | 8/1996 | Ohmaye et al. |
| 5,606,674 A | * | 2/1997 | Root ............................ 345/348 |
| 5,890,123 A | * | 3/1999 | Brown et al. ................ 704/275 |
| 6,044,347 A | * | 3/2000 | Abella et al. ................ 704/275 |
| 6,134,548 A | * | 10/2000 | Gottsman et al. ............. 707/5 |
| 6,173,266 B1 | | 1/2001 | Marx et al. |

FOREIGN PATENT DOCUMENTS

| | | |
|---|---|---|
| EP | 0681 284 | 8/1995 |
| WO | 96/26484 | 8/1996 |
| WO | 99/14689 | 3/1999 |

OTHER PUBLICATIONS

Graphvite—Recognition Prototyping System, Entropic, Issue No. 3, Apr. 1999, 1 page.

* cited by examiner

Primary Examiner—David D. Knepper
(74) Attorney, Agent, or Firm—Blakely, Sokoloff, Taylor & Zafman LLP

(57) ABSTRACT

A graphical tool is provided for allowing a developer of a speech-enabled application to create and edit grammars for speech recognition. The tool provides a user interface that has two editing modes, which the user can quickly and easily switch between. In the first editing mode, the user can specifying a grammar by writing or editing a Grammar Specification Language (GSL) listing. In response to such user inputs, the tool automatically generates or modifies a set of displayable graphical objects representing the grammar. In the second editing mode, the displayable objects are displayed, such that each object represents one or more speech expressions, and the logical relationships between the expressions are graphically represented. The user may edit the set of displayed objects in the second editing mode, including adding or deleting objects, modifying an expression represented by an object, or altering the logical relationships between the expressions. User inputs directed to the objects in the second editing mode are automatically reflected in the GSL listing when the user switches back to the first editing mode.

41 Claims, 24 Drawing Sheets

| Phrase Text | NL Return Value | NL Slot Commands | Probability |
|---|---|---|---|
| a sample expressi... | | | |

Add another Row

Overall Settings

NL Return Value:
NL Slot Commands:
Probability:

☐ Optional
☐ Looping

[OK]  [Cancel]  [Reset]

| Phrase Text | NL Return Value | NL Slot Commands | Probability |
|---|---|---|---|
| dog | | <animal dog> | |
| cat | | <animal cat> | |
| monkey | | <animal monkey> | |
| whale | | <animal whale> | |

Add another Row

Overall Settings

☐ Optional
☐ Looping

NL Return Value:
NL Slot Commands:
Probability:

[ OK ]  [ Cancel ]  [ Reset ]

| Phrase Text | NL Return Value | NL Slot Commands | Probability |
|---|---|---|---|
| the | | | |

Add Another Row

Overall Settings

NL Return Value: ☑ Optional
NL Slot Commands: ☐ Looping
Probability:

OK  Cancel  Reset

CREATING AND EDITING GRAMMARS FOR SPEECH RECOGNITION GRAPHICALLY

FIELD OF THE INVENTION

The present invention pertains to machine-implemented speech recognition. More particularly, the present invention relates to a tool for creating and editing grammars for machine-implemented speech recognition.

BACKGROUND OF THE INVENTION

The use of speech recognition technology is rapidly becoming ubiquitous in everyday life. One application of speech recognition technology is in Interactive Voice Response (IVR) systems. IVR systems are commonly used to automate certain tasks that otherwise would be performed by a human being. More specifically, IVR systems are systems which create a dialog between a human speaker and a computer system to allow the computer system to perform a task on behalf of the speaker, to avoid the speaker or another human being having to perform the task. This operation generally involves the IVR system's acquiring specific information from the speaker. IVR systems may be used to perform very simple tasks, such as allowing a consumer to select from several menu options over the telephone. Alternatively, IVR systems can be used to perform more sophisticated functions, such as allowing a consumer to perform banking or investment transactions over the telephone or to book flight reservations.

Current IVR systems typically are implemented by programming standard computer hardware with special-purpose software. In a basic IVR system, the software includes a speech recognition engine and a speech-enabled application (e.g., a telephone banking application) that is designed to use recognized speech output by the speech recognition engine. The hardware may include one or more conventional computer systems, such as personal computers (PCs), workstations, or other similar hardware. These computer systems may be configured by the software to operate in a client or server mode and may be connected to each other directly or on a network, such as a local area network (LAN). The IVR system also includes appropriate hardware and software for allowing audio data to be communicated to and from the speaker through an audio interface, such as a standard telephone connection.

The speech recognition engine recognizes speech from the speaker by comparing the speaker's utterances to a set of "grammars" stored in a database. In this context, a grammar may be defined as a set of one or more words and/or phrases ("expressions") that a speaker is expected or required to utter in response to a corresponding prompt, and the logical relationships between such expressions. The logical relationships include the expected or required temporal relationships between expressions, whether particular expressions are mandatory, optional, alternatives, etc. Hence, the speech recognition engine may use various different grammars, according to the type of information required by the speech-enabled application.

Defining the set of grammars for a particular IVR application can be time-consuming and difficult. Accordingly, it is desirable to have a tool which facilitates the creation and editing of speech recognition grammars.

SUMMARY OF THE INVENTION

The present invention includes a tool for allowing a user to create or edit grammars for speech recognition quickly and easily. An aspect of the present invention is a method and apparatus for providing a user interface, such that user inputs are received specifying a modification to a displayed grammar specification language (GSL) sequence. The displayed GSL sequence represents a grammar. In response to the user inputs, the displayed GSL sequence and data representing a set of displayable graphical objects representing the grammar are modified.

Another aspect of the present invention is a method and apparatus for providing a user interface for allowing a user to create and edit grammars for speech recognition, in which first user inputs that specify a first grammar for speech recognition are received. In response to the first user inputs, a first set of graphical objects representing the first grammar is generated and a corresponding first GSL sequence representing the first grammar is also generated. Second user inputs specifying a second GSL sequence representing a second grammar for speech recognition are also received. In response to the second user inputs, data representing a second set of graphical objects are generated, wherein the second of graphical objects represent the second grammar.

Yet another aspect of the present invention is a method and apparatus for allowing a user to create and edit grammars for speech recognition, including receiving first user inputs that specify a modification to a displayed set of graphical objects which represent a grammar. In response to the first user inputs, the displayed set of graphical objects and a GSL sequence textually representing the grammar are concurrently modified.

Still another aspect of the present invention is a method and apparatus for providing a user interface for allowing a user to edit grammars for speech recognition, such that the method includes operating in a first editing mode which allows the user to enter first inputs to specify a first grammar. In response to the first inputs, a first set of graphical objects and a corresponding first GSL sequence representing the first grammar are generated. The method further includes operating in a second editing mode for allowing the user to enter second inputs to specify a second GSL sequence. The second GSL sequence includes a second grammar, such that in response to the second inputs, a second set of graphical objects representing the second GSL sequence is generated.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 7 shows an editing window for editing an object in the GUI mode.

FIG. 8 shows an editing window for editing an object in the GUI mode.

FIG. 12 shows a dialog box for adding an object in the GUI the mode.

DETAILED DESCRIPTION

Figure 1:
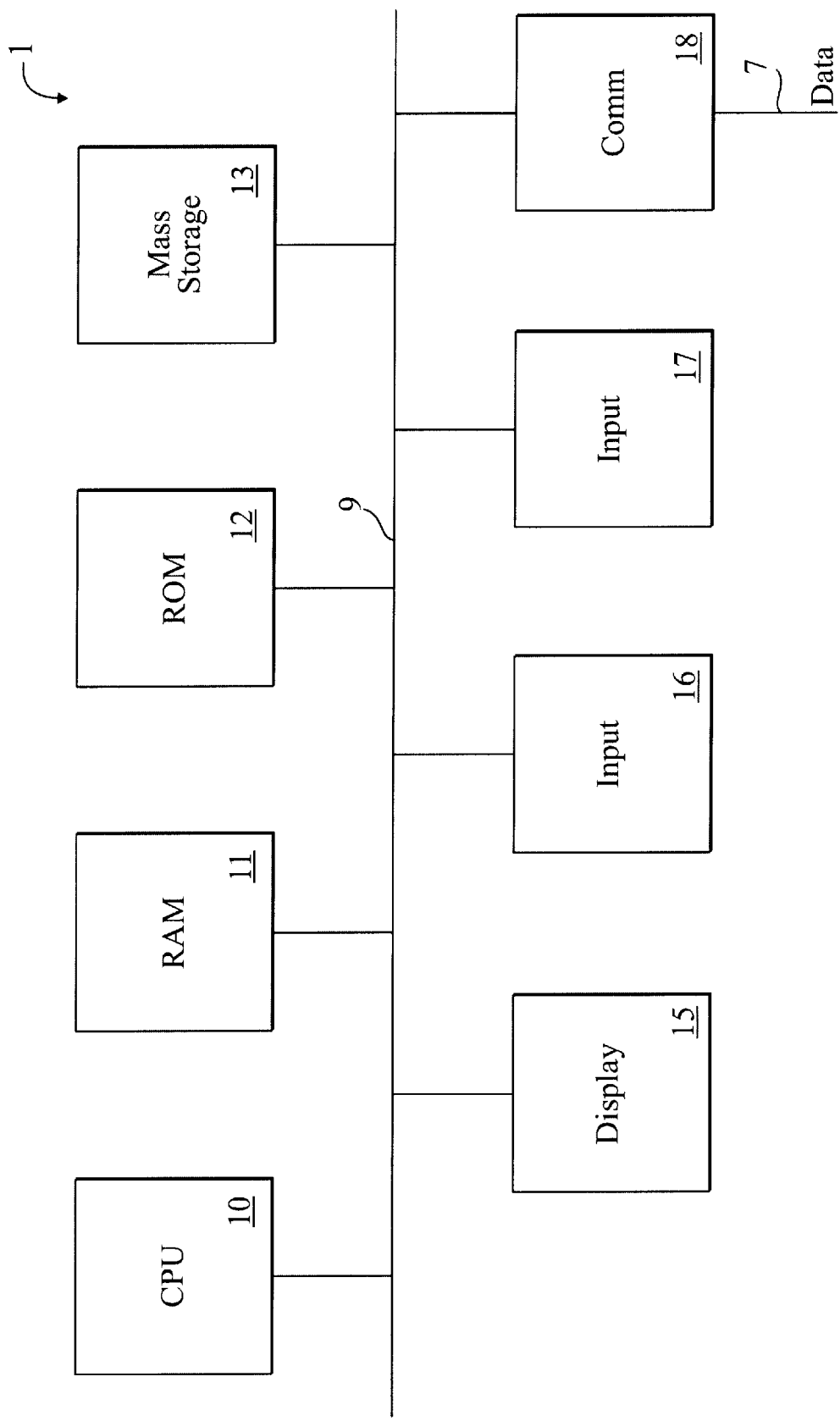
FIG. 1 illustrates a computer system in which the described grammar editing tool can be implemented.

A method and apparatus for allowing a user to create and edit grammars for speech recognition are described. In particular, a graphically based grammar editing tool for allowing a developer of a speech-enabled application to create and edit grammars is described. As will be described in greater detail below, the editing tool generates a computer user interface that has two editing modes, a Grammar Specification Language (GSL) mode and a Graphical User Interface (GUI) mode, between which the user can quickly and easily switch back and forth while editing a given grammar. The GSL mode supports creation and editing of grammars using code-level description, whereas the GUI mode supports creation and editing of grammars by the manipulation of graphical objects.

More specifically, in the GSL mode, the user can specify or edit a grammar by writing or editing a GSL listing. In response to such user inputs, the tool automatically generates or modifies a set of displayable graphical objects representing the grammar. Note that while a specific example of a GSL is described herein, in the context of the present invention a "GSL" is any language for specifying a grammar. In the GUI mode, the displayable objects are displayed, such that each object represents one or more speech expressions of the grammar. The connections between the displayed objects graphically represent the logical relationships between the expressions in the grammar. The user may also edit the set of displayed objects in the GUI mode, including adding or deleting objects/ expressions, modifying an expression, or altering the logical relationships between the objects/expressions. User inputs directed to the objects/expressions in the GUI mode are automatically reflected in the GSL listing when the user switches back to the GSL mode, and vice versa. The GUI mode supports various features to facilitate editing of grammars, such as selective expansion and compression of displayed objects or groups of objects, dragging-and-dropping of objects, and cutting/copying-and-pasting of objects. Thus, the described grammar editing tool accommodates developers who are most comfortable working with code as well as those who are most comfortable working with graphical objects. In addition, the tool facilitates interpretation of complex GSL listings by developers not familiar with the represented grammar.

As will be apparent from the following description, the grammar editing tool may be partially or entirely embodied in software. The software may be executed from memory in a conventional computer system and may be loaded from a persistent store, such as a mass storage device, or from one or more other remote computer systems (collectively referred to as "host computer system"). In the latter case, for example, a host computer system may transmit a sequence of instructions to the ("target") computer system in response to a message transmitted to the host computer system over a network by target computer system. As the target computer system receives the instructions via the network connection, the target computer system stores the instructions in memory.

In some cases, the downloaded instructions may be directly supported by the Central Processing Unit (CPU) of the target computer system. Consequently, execution of the instructions may be performed directly by the CPU. In other cases, the instructions may not be directly executable by the CPU. Under the latter circumstances, the instructions may be executed by causing the CPU to execute an interpreter or virtual machine that interprets the instructions or by causing the CPU to execute instructions which convert the received instructions to instructions which can be directly executed by the CPU.

Also, in various embodiments of the present invention, hardwired circuitry may be used in place of, or in combination with, software to implement the present invention. Thus, the present invention is not limited to any specific combination of hardware circuitry and software, nor to any particular source for the software executed by a computer system.

Refer now to FIG. 1, which illustrates a computer system in which the grammar editing tool can be implemented. Note that FIG. 1 is a high-level conceptual representation that is not intended to represent any one particular architectural arrangement. Further, many variations on the embodiment of FIG. 1 will also support the grammar editing tool. Hence, components may be added to, or omitted from, the components shown in FIG. 1.

The illustrated computer system 1 includes a microprocessor (CPU) 10, random access memory (RAM) 11, read-only memory (ROM) 12, and a mass storage device 13, each connected to a bus system 9. Bus system 9 may include one or more buses connected to each other through various bridges, the controllers and/or adapters, such as are well-known in the art. For example, the bus system 9 may include a main bus (i.e., to a "system bus") connected through an adapter to one or more expansion buses, such as a Peripheral Component Interconnect (PCI) bus. Mass storage device 13 may include any device suitable for storing large volumes of data, such as a magnetic disk or tape, magneto-optical (MO) storage device, or any of various types of Digital Versatile Disk (DVD) or compact disk (CD-X) storage.

Also coupled to the bus system 9 are a display device 15, a number of different input devices 16 and 17, and a data communication device 18. The display device 18 may be any suitable device for displaying alphanumeric, graphical and/or video data to a user, such as a cathode ray tube (CRT), a liquid crystal display (LCD), or the like, and associated controllers. The input devices 16 and 17 may include any of various types of input devices, such as a keyboard, and mouse, touchpad, or trackball, or a microphone in combination with appropriate supporting audio hardware and speech recognition software. The communication device 18 may be any device suitable for or enabling the computer system 1 to communicate data with another computer system over a communication link 7, such as a conventional telephone modem, cable modem, satellite modem, Integrated Services Digital Network (ISDN) adapter, Digital Subscriber Line (xDSL) adapter, network interface card (NIC), Ethernet adapter, or the like. The data communication device 18 may be used to allow the computer system 1 to transmit instructions representing the grammar editing tool to a remote processing system, as described above.

Figure 2:
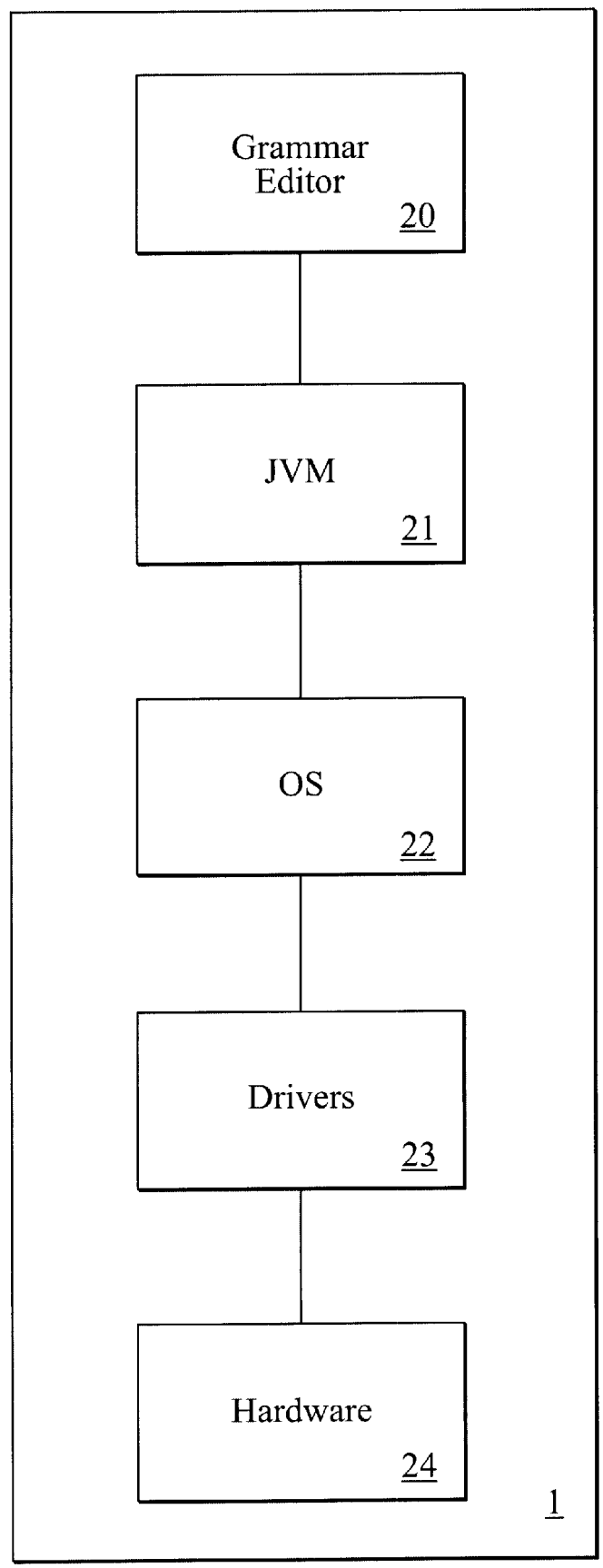
FIG. 2 illustrates a software configuration of the computer system of FIG. 1.

FIG. 2 illustrates the software configuration of computer system 1, according to a least one embodiment. In FIG. 2, the grammar editing tool is shown as grammar editor 20. In at least one embodiment, grammar editor 20 is written in the Java programming language. Hence, a Java Virtual Machine (JVM) is operatively coupled between the grammar editor 20 and the operating system (OS) of the computer system 1. It should be noted, however, that the grammar editor 20 may alternatively be implemented in any of various other programming languages. The OS 22 is coupled to various drivers 23 for controlling the hardware 24 (i.e., display device 15, input devices 16 and 17, communication device 18, etc.) of the computer system 1.

Figure 3:
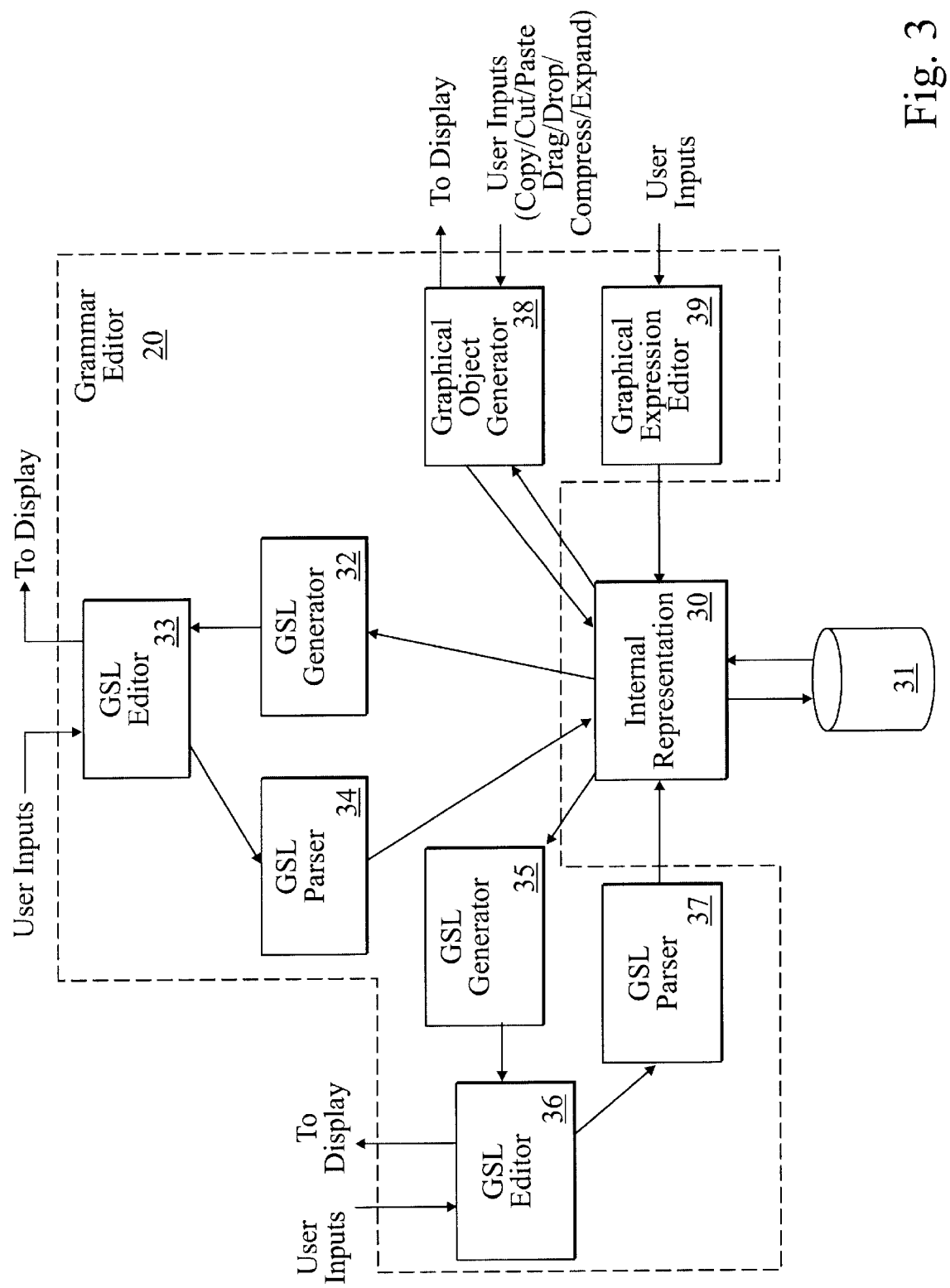
FIG. 3 illustrates the components of the grammar editing tool.

FIG. 3 illustrates the grammar editor 20 in greater detail, according to at least one embodiment. The grammar editor 20 includes a GSL generator 32, a GSL editor 33, a GSL parser 34, a graphical object generator 38, and a graphical expression editor 39. Optionally, the grammar tool 20 may also include one or more additional GSL generators 35, GSL editors 36, and GSL parsers 37, to support one or more additional GSL syntaxes. It may be assumed that any such additional GSL generator 35, GSL editor 36, and/or GSL parser 37 operates in substantially the same way as its counterpart, i.e., GSL generator 32, GSL editor 33, or GSL parser 34, respectively, as described below.

The grammar tool 20 generates, for any given grammar, an internal representation 30 of the grammar, which is a data structure. The internal representation 30 may be stored in a memory, such as RAM 11, or in a persistent database 31. The database 31 may be maintained within the computer system 1, such as in mass storage device 13, or external to computer system 1. In some embodiments, the database 31 may be an integral component of the grammar editor 20.

When the user has selected the GSL mode, the GSL editor 33 operates to provide a user interface for allowing the user to enter and edit a GSL listing representing a grammar. The GSL listing specifies one or more expressions and, if appropriate, logical relationships between the expressions, which collectively constitute the grammar. The GSL parser 34 then parses the GSL sequence according to a specified GSL syntax to generate the internal representation 30. The internal representation 30, which is described further below, indicates the logical relationships between the expressions in the grammar, as indicated by the syntax. An example of a suitable GSL syntax is described below. Note, however, that in the context of the present invention, a "GSL" is any language for specifying a grammar; therefore, other (alternative or additional) syntaxes can be used.

The GSL generator 32 continually accesses the internal representation 30 (at least when GSL mode is selected) and, based on the internal representation 30, provides appropriate data representing the current state of the GSL listing to the GSL editor 33 for outputting to the display device. If the user modifies the GSL listing, then the GSL parser 34 automatically updates the internal representation 30 accordingly, and the updates are automatically provided by the GSL generator 32 to the GSL editor 33 for output to the display.

The graphical object generator 38 continually accesses the internal representation 30 (at least when GUI mode is selected) and, based on the internal representation 30, generates data representing a set of displayable graphical objects and connections between the objects. The graphical objects and connections are for visually representing the grammar when the grammar tool is in the GUI mode, as described further below. The outputs of the graphical object generator 38 are provided to the display device 15 for display. The graphical object generator 38 also may receive user inputs of various types (e.g., drag-and-drop, cut/copy-and-paste, expand/compress), such as for creating objects to represent expressions, moving objects around to change the temporal relationships between the represented expressions, etc. In response to these user inputs, the graphical object generator 38 updates the internal representation 30 accordingly.

The graphical expression editor 39 generates a user interface while in the GUI mode, such as dialog windows, to allow the user to enter other types of inputs (e.g., text-based) directed to the graphical objects. These user inputs, which are described further below, may include inputs for creating or altering an expression represented by a given object, changing the temporal relationships between expressions, creating objects to represent expressions, etc. In response to these user inputs, the graphical expression editor 39 updates the internal representation 30 accordingly.

Note that in certain embodiments, the display associated with only one of the GSL mode and the GUI mode may be visible to the user at any given time. In other embodiments, however, the displays of both editing modes may be visible to the user, regardless of which editing mode is currently active. In the latter case, for example, the displays for the GSL mode and GUI mode may be provided in side-by-side windows. Hence, in at least one embodiment, the graphical object generator 38 automatically updates the graphical objects (which are not necessarily always displayed) in response to any changes to the internal representation 30, including changes made by a GSL parser 34 or 37. Similarly, in at least one embodiment, a GSL generator 32 or 36 automatically updates the GSL listing (which is not necessarily always displayed) in response to any changes to the internal representation 30, including changes made by the graphical object generator 38 or graphical expression editor 39.

As indicated above, the grammar tool 20 does not require more than one GSL parser, GSL generator, or GSL editor. That is, only one of each of these elements is needed if only one GSL syntax is to be supported. However, it may be desirable for the grammar tool 20 to support more than one syntax. By supporting two or more syntaxes, the grammar tool 20 may be used to convert GSL listings from one syntax to another or to view and edit grammars created in multiple different syntaxes. In such embodiments, each GSL parser (e.g., 34 and 37), each GSL Generator (e.g., 32, and 36), and each GSL editor (e.g., 33 and 36) may be designed to support a different syntax. For example, although one example of a GSL syntax is described below, another syntax which may be supported is the Java Speech Grammar Format (JSGF). Note also that a common GSL editor may be used to support multiple syntaxes.

The following technique is used to generate the internal representation 30, according to at least one embodiment. A base class, referred to herein as Expression, is created, from which subclasses are derived to represent specific types of grammar expressions. Specifically, a class Expression.Word is derived from Expression to represent a single word such as "dog". A class Expression.Reference is derived from Expression to represent a reference (a pointer or a link) to an expression defined and named elsewhere. A class Expression.Sequence is derived from Expression to encapsulate a sequence of other expressions. For instance, the words "the", "big", and "cat" may be stored in three instances of the Expression.Word class, and an Expression.Sequence containing those three Expression.Word instances thereby represents the phrase "the big cat". Similarly, an Expression.Alternatives class may be defined to contain a set of expressions, any one of which may be spoken.

The classes Expression.Sequence and Expression.Alternatives both represent sets of Expressions, not sets of words. Thus, for example, an Expression.Sequence might represent a sequence of three other Expressions, in which the first and last contained Expressions are Expression.Words, and the middle contained Expression is actually an Expression.Alternatives. Since the structures are recursive in this way, any arbitrarily complex grammar structure can be represented with these four classes.

In addition, each Expression class also contains flags indicating whether that expression is optional and whether is it repeatable (i.e., can be said several times). Each Expression class also contains structures representing the Natural Language statements and the probabilities associated with the Expression.

Figure 4:
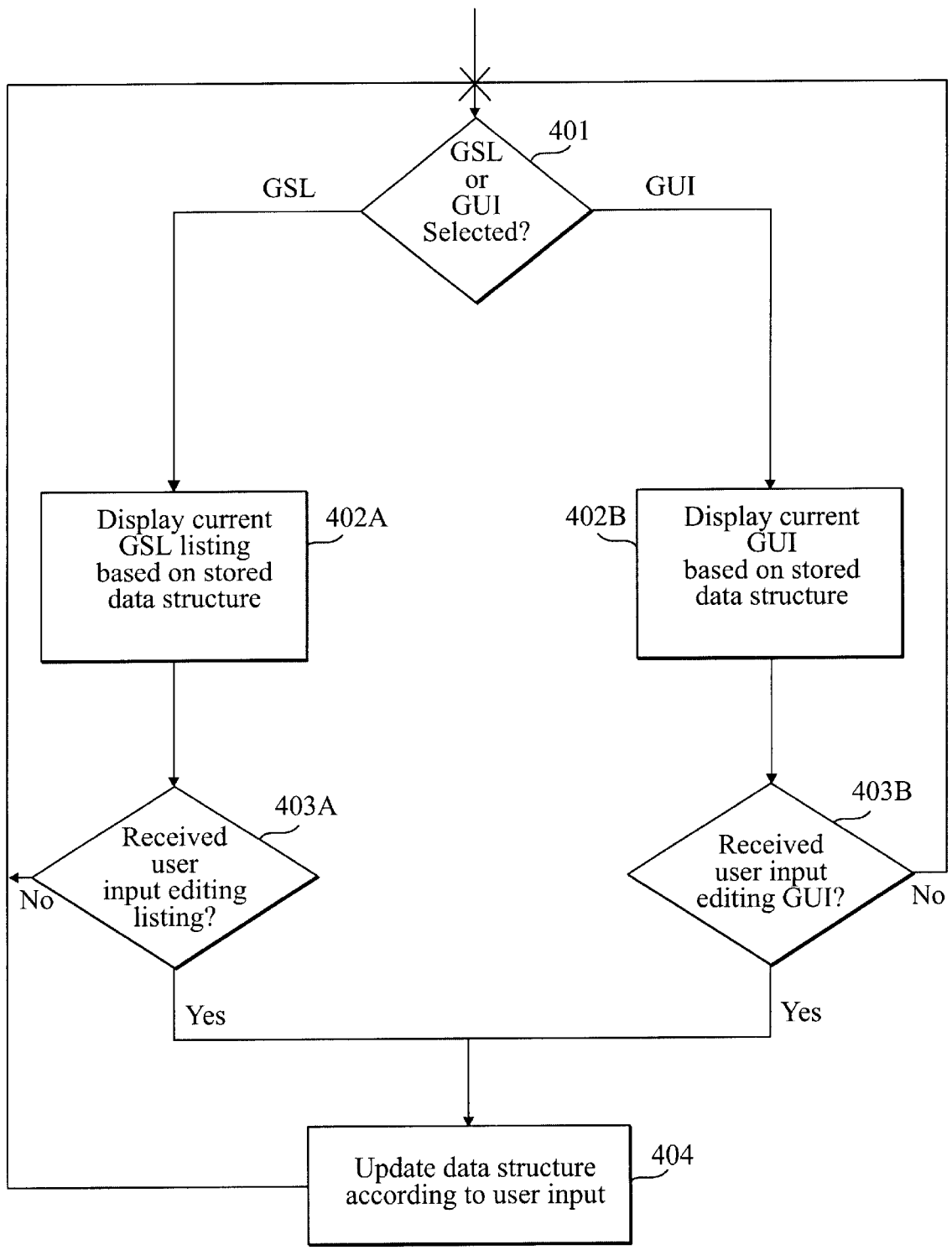
FIG. 4 is a flow diagram illustrating a routine representing the overall operation of the grammar editing tool.

FIG. 4 shows a routine representing the overall operation of the grammar editor 20. At 401, a determination is made of whether the user has selected the GSL mode or the GUI mode. If the user has selected the GSL mode, then at 402A the current GSL listing is displayed based on the data structures stored in database 34 (if any). Following 402A, it is determined at 403A whether user inputs for editing the GSL listing have been received. If not, then the routine repeats from 401. If so, then at 404 the data structures stored in database 34 are updated according to the received user inputs, and the routine repeats from 401. If it is determined that the user selected the GUI mode at 401, then at 402B the current GUI display is generated based on the stored data structures in database 34 (if any). Following 402B, a determination is made at 403B whether user inputs for editing the GUI have been received. If not, then the routine repeats from 401. If so, then at 404 the database 34 is updated according to the received user inputs, and the routine repeats from 401. Note that many variations upon this routine are possible.

Figure 5:
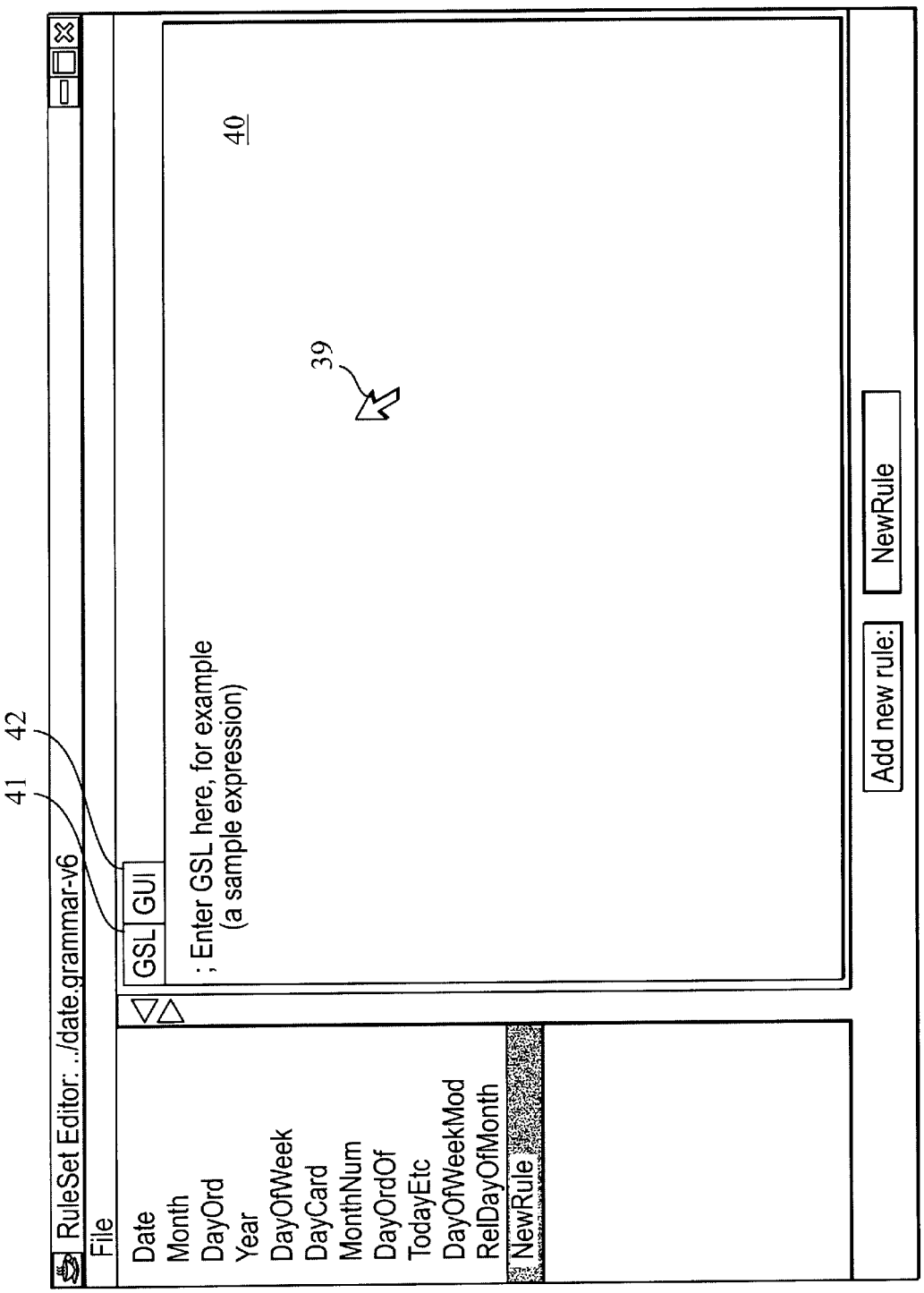
FIG. 5 shows a display generated by the grammar editing tool in the Grammar Specification Language (GSL) mode.

FIG. 5 shows an example of the display generated by the grammar editing tool when the GSL mode is selected. Using any conventional pointing device, the user can manipulate a pointer 39 to select the displayed "GSL" tab 41 or the displayed "GUI" tab 42 to select and switch between the GSL and GUI editing modes, respectively. The user may enter text such as illustrated into area 40, using a keyboard or speech recognition technology, to specifying a GSL listing representing a grammar. As shown, the expression, "a sample expression," appears in the area 40. This expression follows the comment, "Enter GSL here, for example", which is denoted as a comment by the preceding semicolon ";".

Figure 6A:
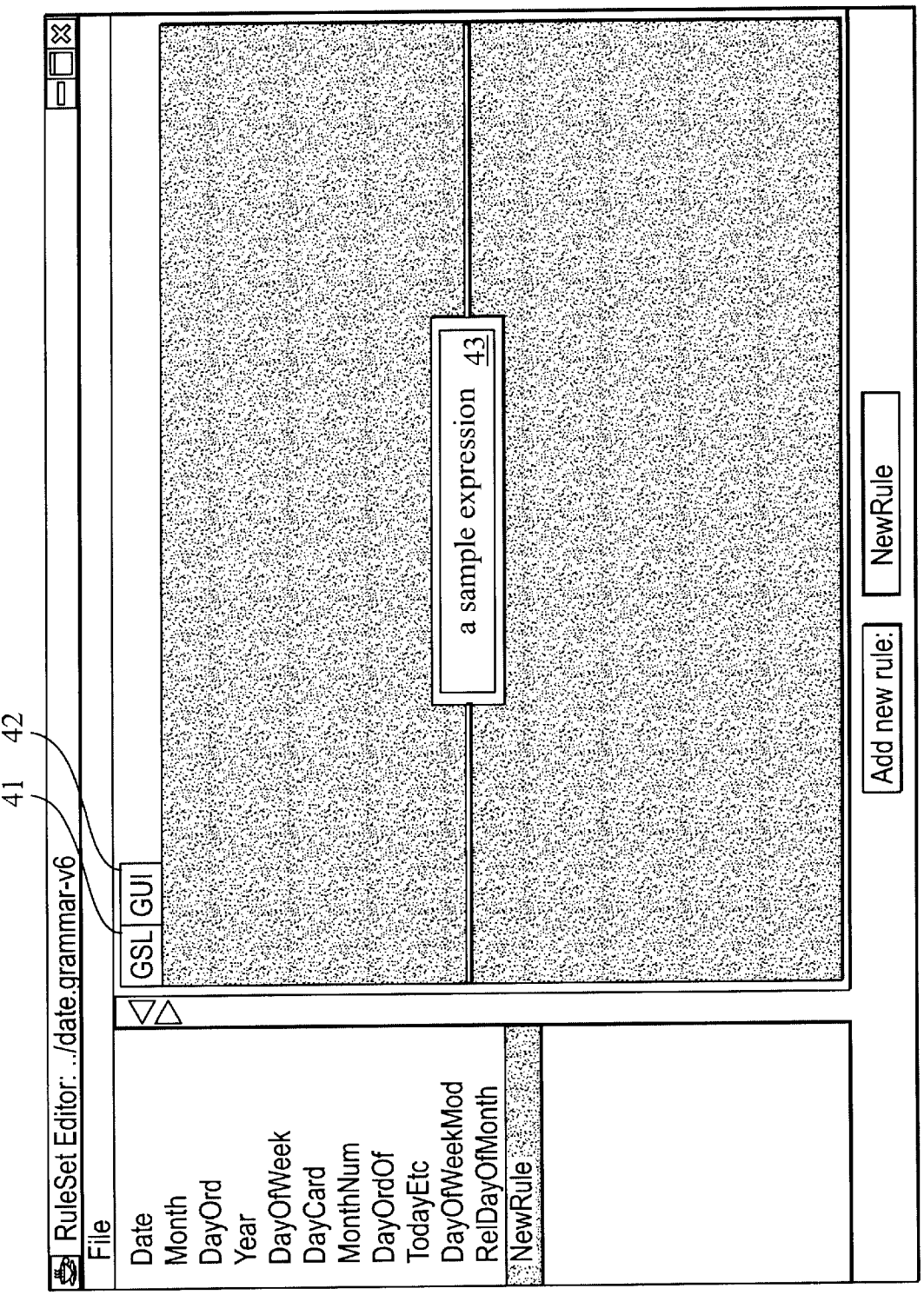
FIG. 6A shows a display generated by the grammar editing tool in the Graphical User Interface (GUI) mode.

FIG. 6A shows an example of a display generated by the grammar is editing tool in the GUI mode. The GUI display shown in FIG. 6 a corresponds to the GSL display of FIG. 5. In particular, the display of FIG. 6A includes an object 43 representing the expression, "a sample expression" in the GSL listing.

Figure 6B:
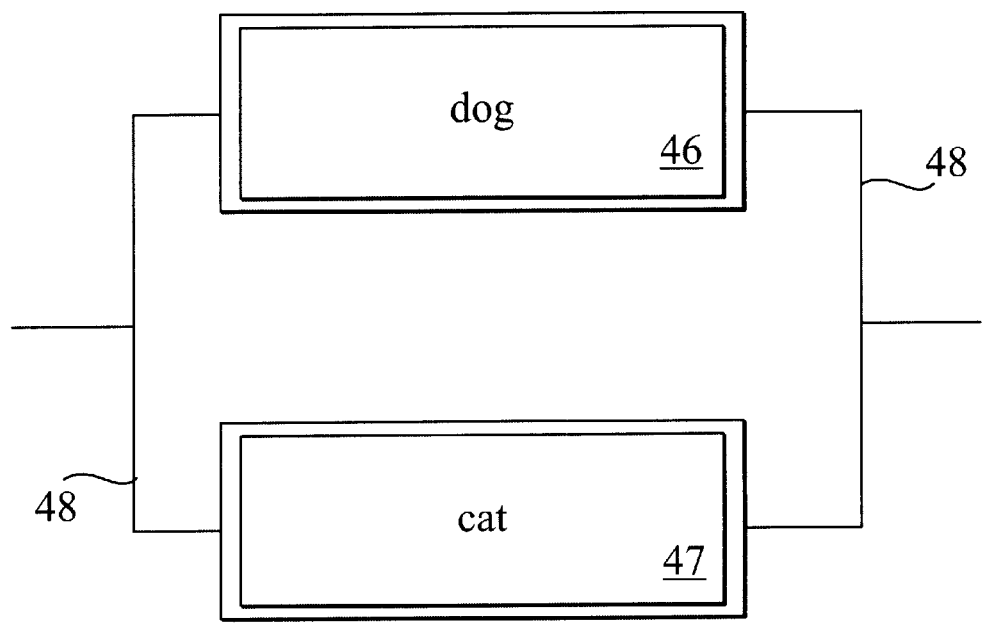
FIG. 6B shows two graphical objects representing two alternative expressions, shown in expanded format.
Figure 6C:
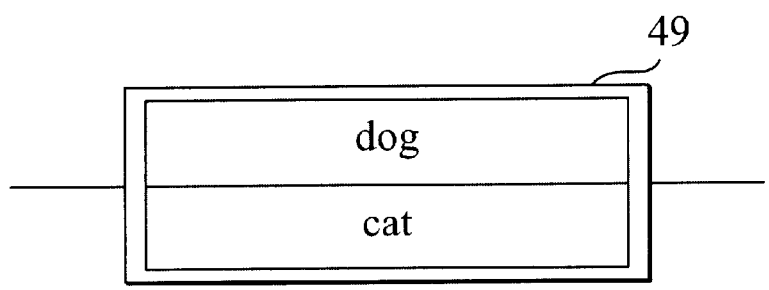
FIG. 6C shows the graphical objects of FIG. 6B, shown in compressed format.

Note that the details of the syntax of the GSL are not necessary for an understanding of the present invention. Nonetheless, certain aspects of the syntax may be useful to facilitate description. Hence, certain aspects of the syntax of the GSL will now be further described, according to at least one embodiment. In the GSL syntax, alternative expressions (i.e. multiple expressions, only one of which the speaker is expected to say) are indicated between brackets "[ ]". For example, if the speaker is expected to say either "dog" or "cat" in response to a given prompt, that requirement is represented as "[dog cat]" in the GSL listing. Alternative expressions such as this are represented as objects in the GUI display as shown in FIGS. 6B and 6C. Specifically, FIG. 6B shows two objects 46 and 47 representing the alternative expressions "dog" and "cat", respectively, shown in the expanded format. Alternative expressions are shown as objects connected by lines 48 in a parallel configuration. FIG. 6C shows the same alternative expressions represented in the compressed format as a single object 49. The user can choose either the expanded or compressed format according to his preference to facilitate editing. The expansion and compression features are useful for editing a very large and/or complex grammar in the GUI mode and are described further below.

"Mandatory" expressions (i.e. multiple expressions, each of which the is speaker is expected to say) are placed between parentheses "( )". For example, if the user is expected to say both "the" and "cat" in that order in response to given prompt, this may be represented in the GSL listing as "(the cat)".

Figure 6D:
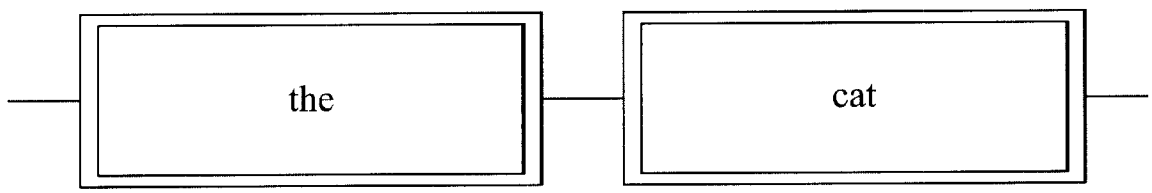
FIG. 6D shows two graphical objects representing two mandatory expressions of a grammar.

FIG. 6D shows the corresponding GUI display for the above GSL fragment. As shown, mandatory expressions are displayed in the GUI display as objects connected in a series configuration. Note that mandatory expressions may be mandatory only locally within a given logical branch of the grammar, i.e., both expressions are required only when the branch which contains them is applicable. Hence, in either editing mode the user can specify multiple, nested levels of alternative and mandatory expressions, as illustrated further in the examples described below.

In the GUI mode, the user can easily edit the grammar by manipulating objects and/or their corresponding expressions. Assume, for example, that the user wishes to edit the simple grammar illustrated in the GUI display of FIG. 6A. To do this, the user may use the pointing device to position the pointer over object 43 and then right-click on his mouse button or perform another similar predetermined action. This causes an editing dialog window to appear, using which the user may edit the object 43. FIG. 7 shows an example of an editing window 45 for editing an object in the GUI mode. As shown, the editing window 45 includes a "Phrase Text" field containing the text of the expression or expressions (in this example, the single expression, "a sample expression")

represented by the corresponding object 43. The parentheses required in the above-described GSL syntax do not need to be used in the editing window 45. In addition, the editing window 45 includes several other fields and options which the user can use to tailor the characteristics of the corresponding object/expression. In particular, the editing window 45 includes an "NL Return Value" field for specifying the natural language (NL) value that is to be returned to the application when the corresponding expression is recognized; an "NL Slot Commands" field for specifying any NL slot commands; and a "Probability" field for specifying expected likelihood that the speaker's utterance is the specified expression. A particular expression can be specified as optional by checking the "Optional" box. An object representing an optional expression is displayed with a dashed-line box surrounding it. By clicking on the "Add Another Row" button, the user can add additional rows to the editing window 45 to enter alternative expressions. This functionality is illustrated further in connection with FIG. 8.

Figure 9:
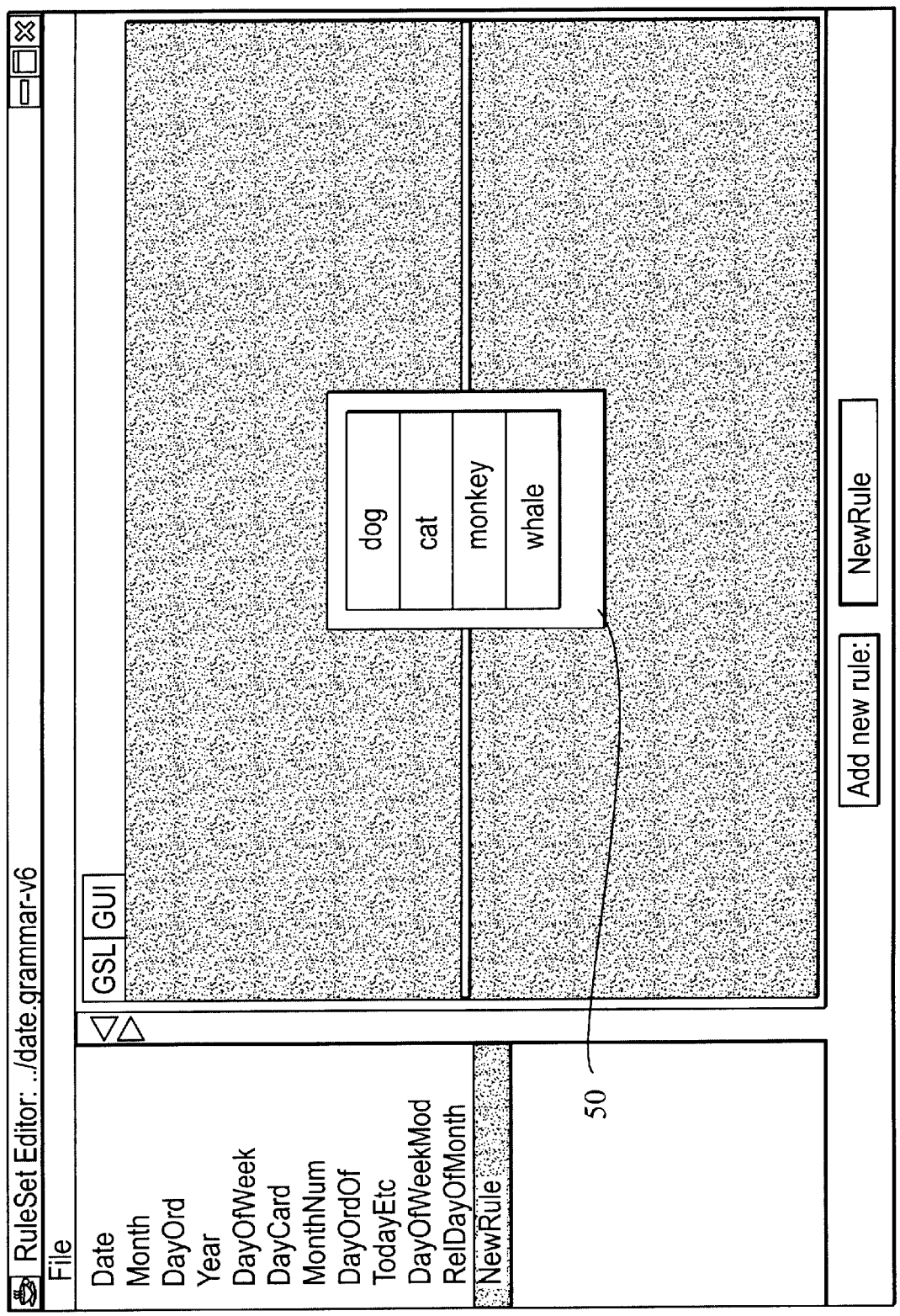
FIG. 9 shows a display in the GUI mode with an object according to the editing window of FIG. 8.

FIG. 8 illustrates an example of the editing window 45 in which several alternative expressions are specified. Specifically, the editing window 45 contains four alternative expressions, "dog", "cat", "monkey", and "whale", each of which may correspond to a separate object in the GUI display. As shown, NL slot commands have been entered for each of these expressions. Each NL slot command is denoted by the "< >" symbols. FIG. 9 shows the GUI display corresponding to the editing window 45 of FIG. 8. In FIG. 9, the four alternative expressions are represented (displayed in compressed form) by object 50.

Figure 10:
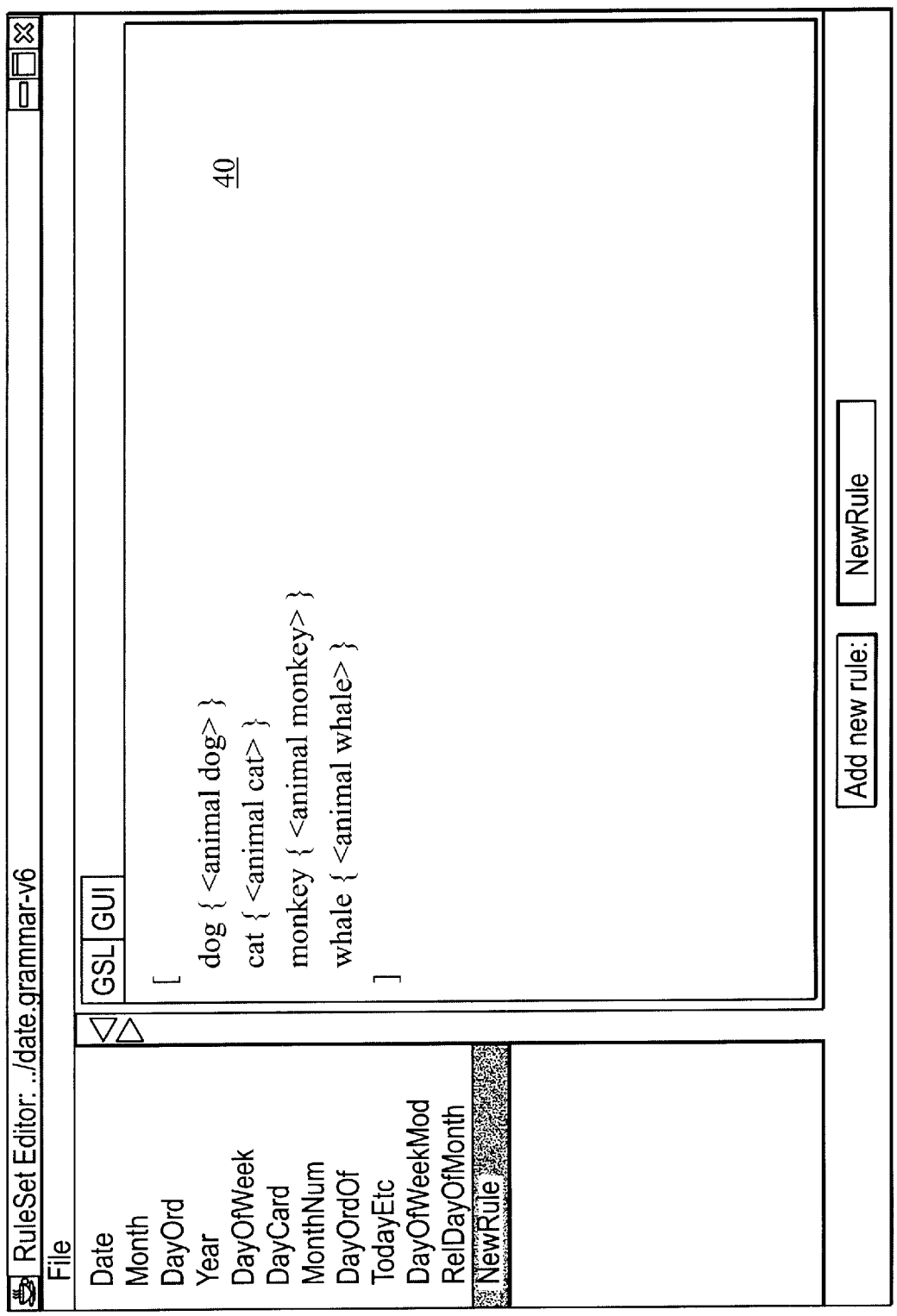
FIG. 10 shows a display in the GSL mode corresponding to the object shown in FIG. 9.

FIG. 10 illustrates the GSL display corresponding to the GUI displays of FIGS. 7 and 8. As noted above, the data stored in database 34 (FIG. 3) is automatically updated in response to edits made in the GUI display mode. Consequently, the GSL display is automatically updated in response to user inputs directed to the GUI display, and vice versa.

Figure 11:
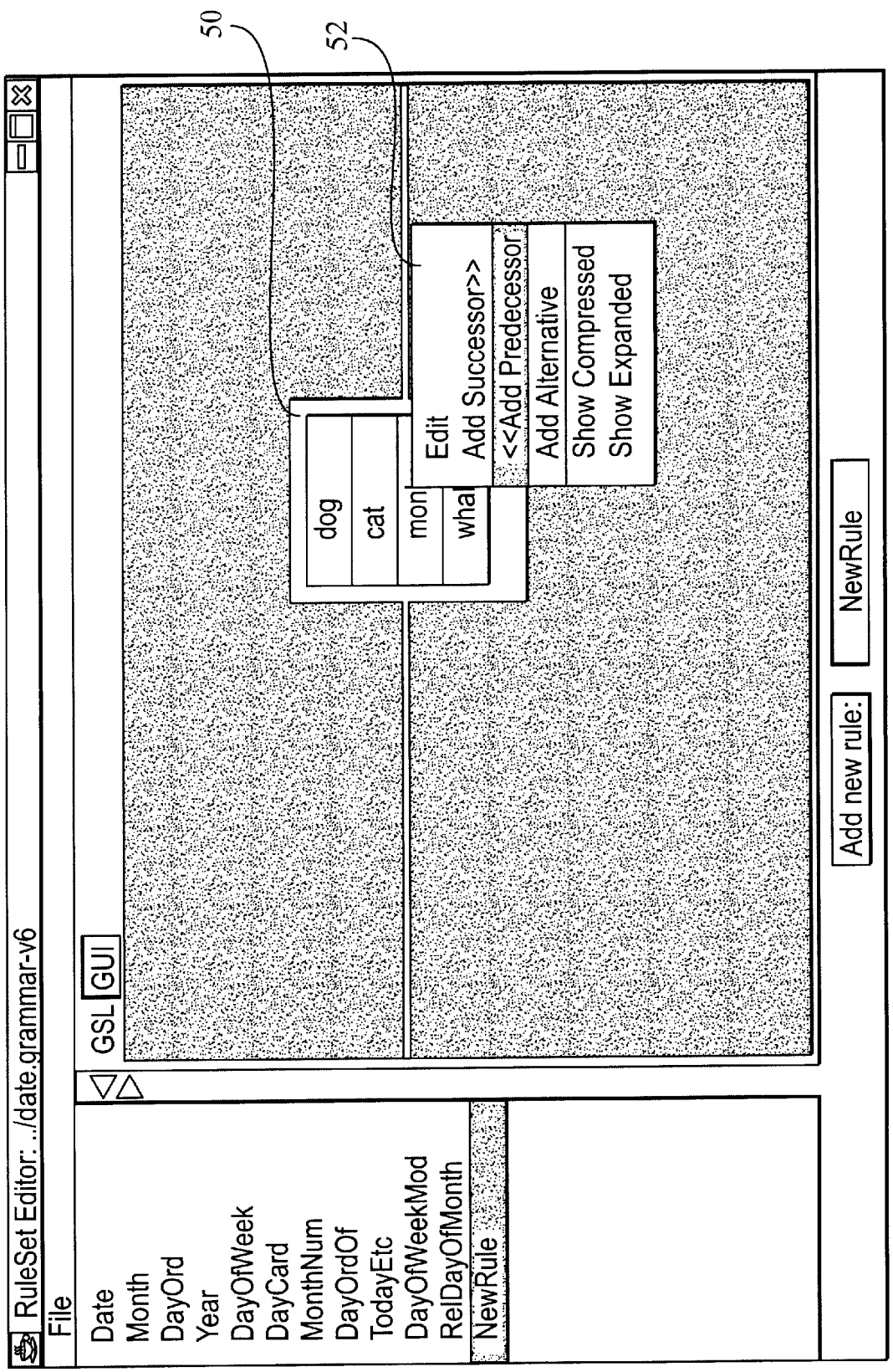
FIG. 11 shows a display in the GUI mode by which the user can select editing options.
Figure 13:
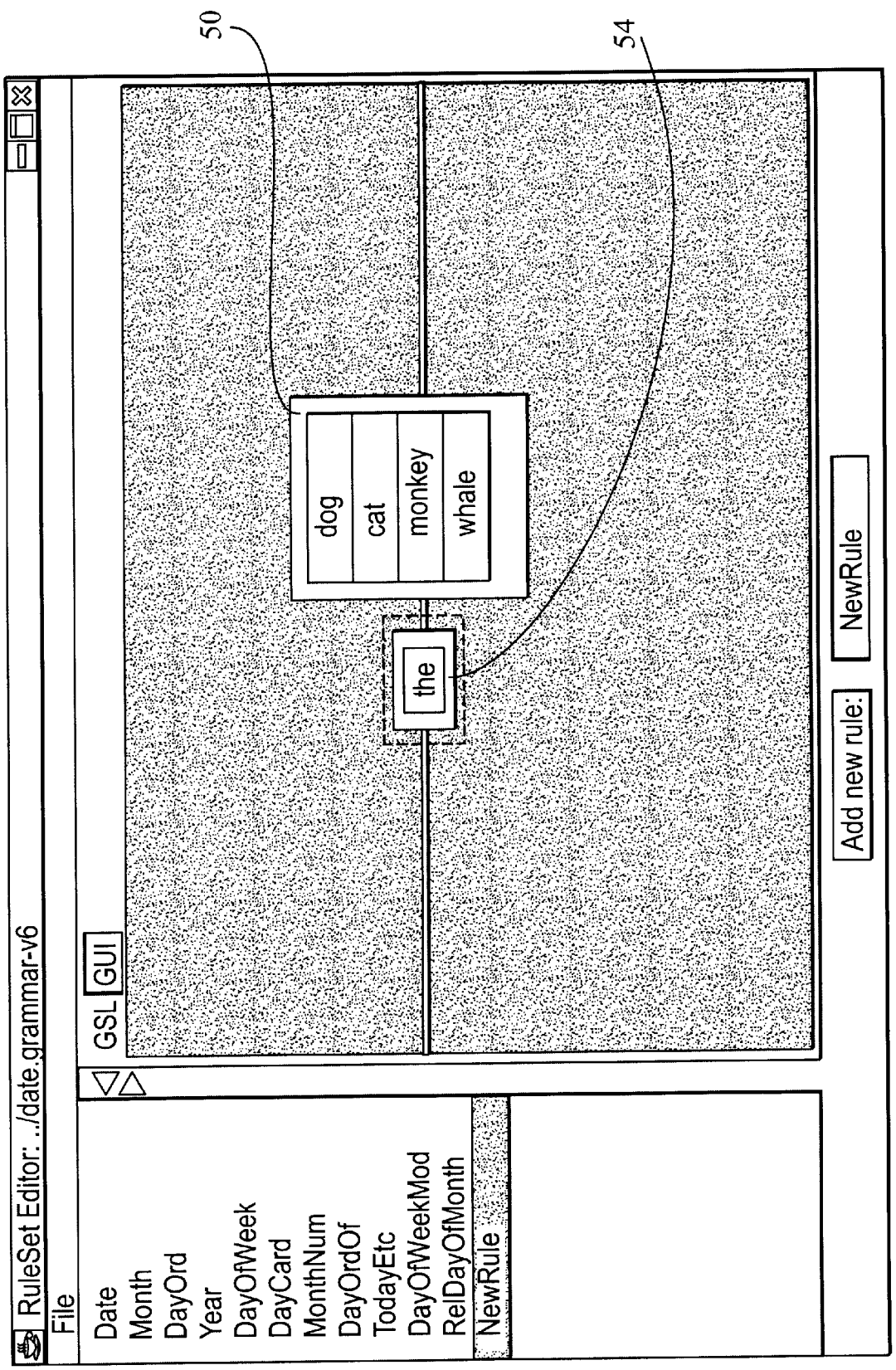
FIG. 13 shows a display in the GUI mode associated with the dialog box of FIG. 12.

A technique by which the user can add or edit objects representing expressions to the GUI display is described now with reference to FIGS. 11 through 13. Referring to FIG. 11, right clicking on the object 50 causes the menu 52 to appear in the display. From the menu 52, the user can select from among several options to edit the object 50 ("Edit") (using the editing window 45), add objects to the left of the selected object ("Add Predecessor") or to the right of the selected object ("Add Successor"), add objects representing alternative expressions ("Add Alternative"), expand an object representing multiple expressions into multiple objects ("Show Expanded"), or compress multiple objects into a single object ("Show Compressed"). The expansion and compression features are useful for allowing the user to obtain a display arrangement that is most comfortable for user. In particular, these features are useful in editing a very large and/or complex grammar in the GUI mode. In addition, the GUI mode also supports the use of conventional drag-and-drop and copy/cut-and-paste functions to rearrange objects/expressions within the grammar.

With regard to adding objects, note that an object positioned to the left of a given object represents an expression that occurs before the expression of the given object in time; similarly, an object positioned to the right of a given object represents an expression that occurs after the expression of the given object in time. Thus, to add an object to the left of the selected object 50, the user may select "Add Predecessor" from the menu 52. This action causes a blank editing window 45 to appear, into which the user can enter text to specify a new expression and any associated values. For example, referring to FIG. 12, assume that the user enters the new expression "the" into the editing window 45 after having selected "Add Predecessor". After the user clicks "OK", the GUI display appears as shown in FIG. 13, in which the new objects 54 representing the expression "the" is displayed to the left of the selected object 50. Adding an object to the right of the selected object is performed in a similar manner.

Figure 14:
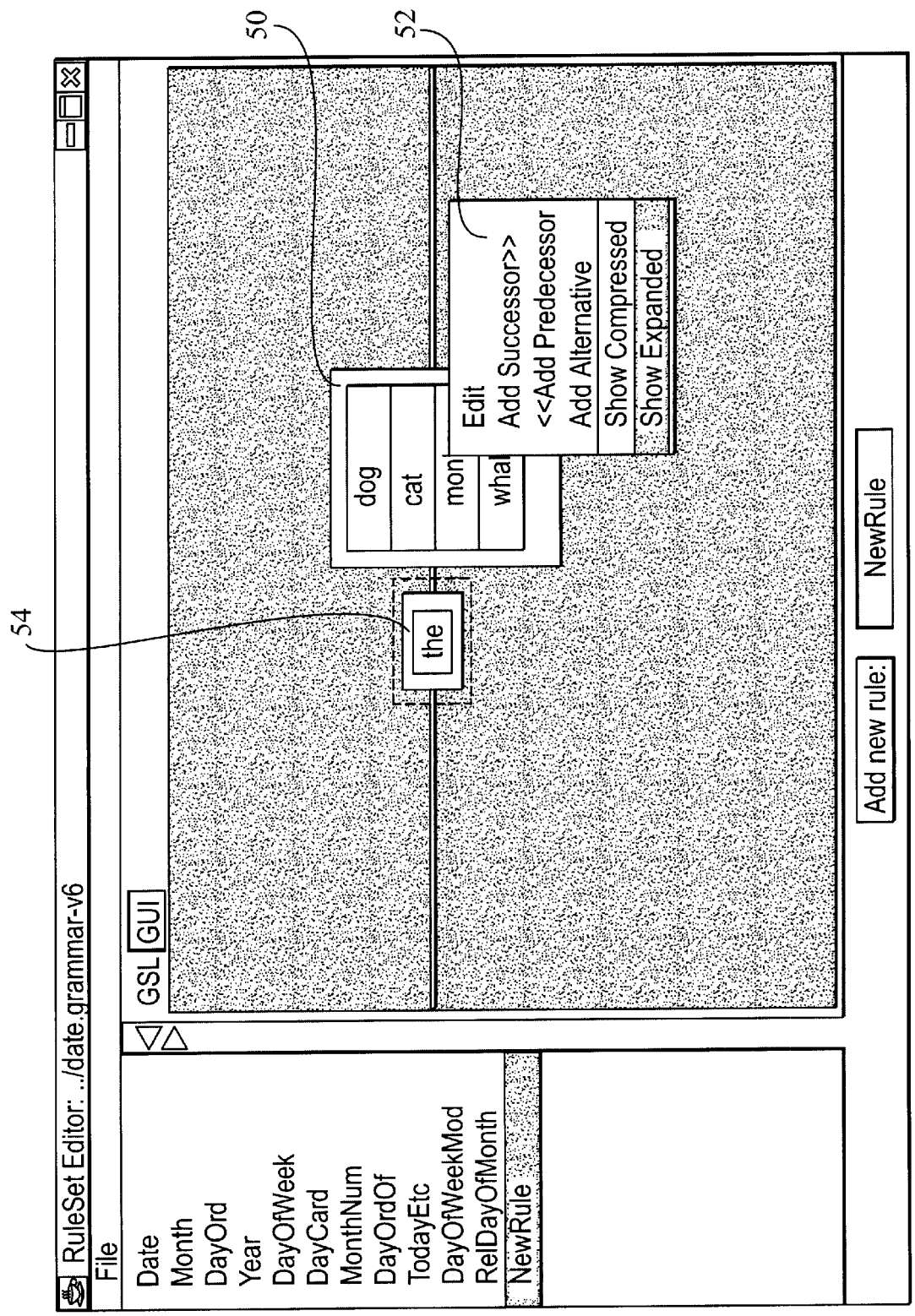
FIG. 14 shows a display in the GUI mode by which the user can select editing options.
Figure 15:
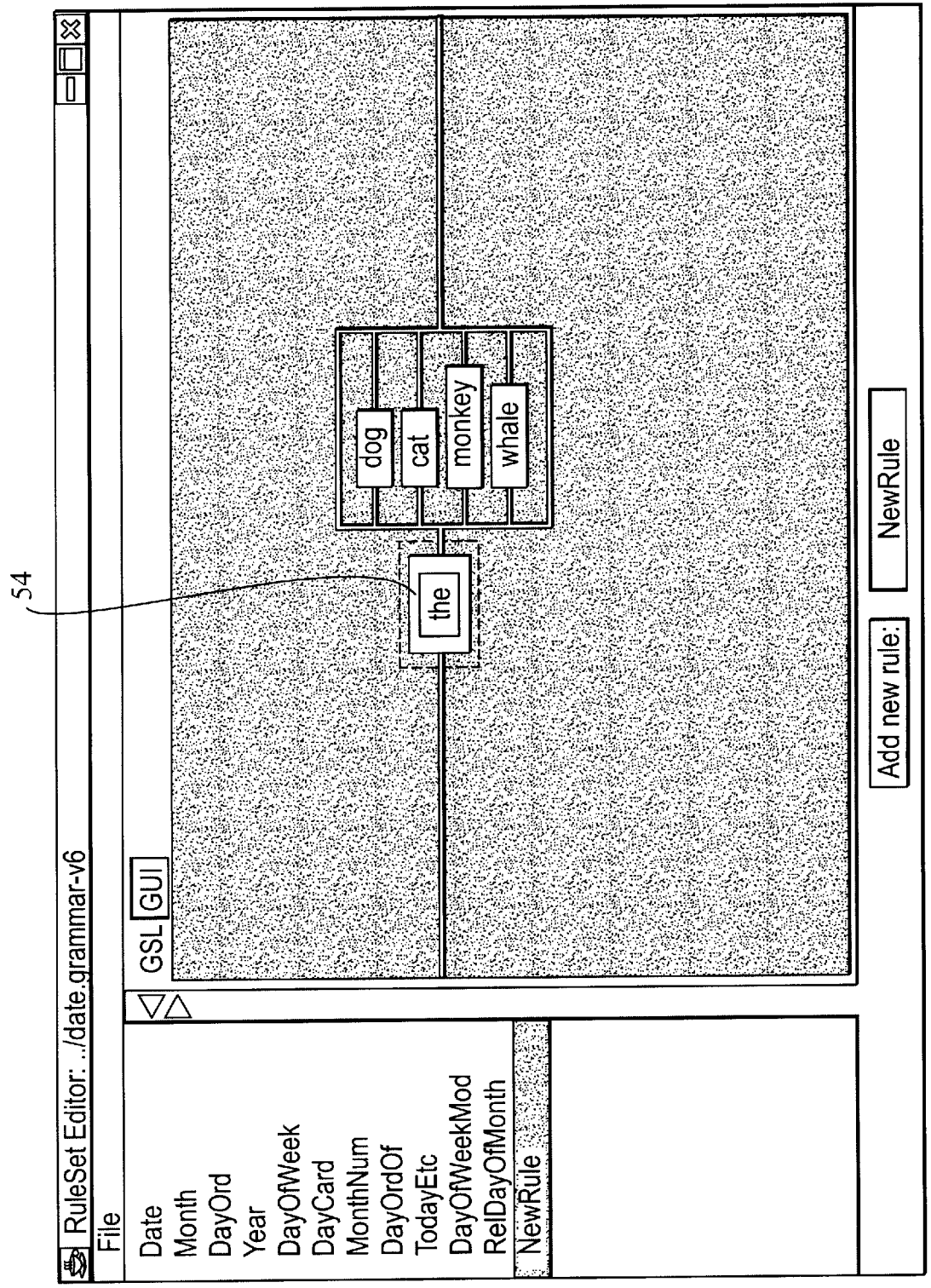
FIG. 15 shows a display in the GUI mode after an object shown in FIG. 14 has been expanded.

In FIG. 14, object 50 represents four alternative expressions shown in compressed form. To obtain an expanded view, the user selects "Show Expanded" from the menu 52, which results in the display shown in FIG. 15, in which the object 50 is replaced by four separate objects representing the four alternative expression.

Figure 16:
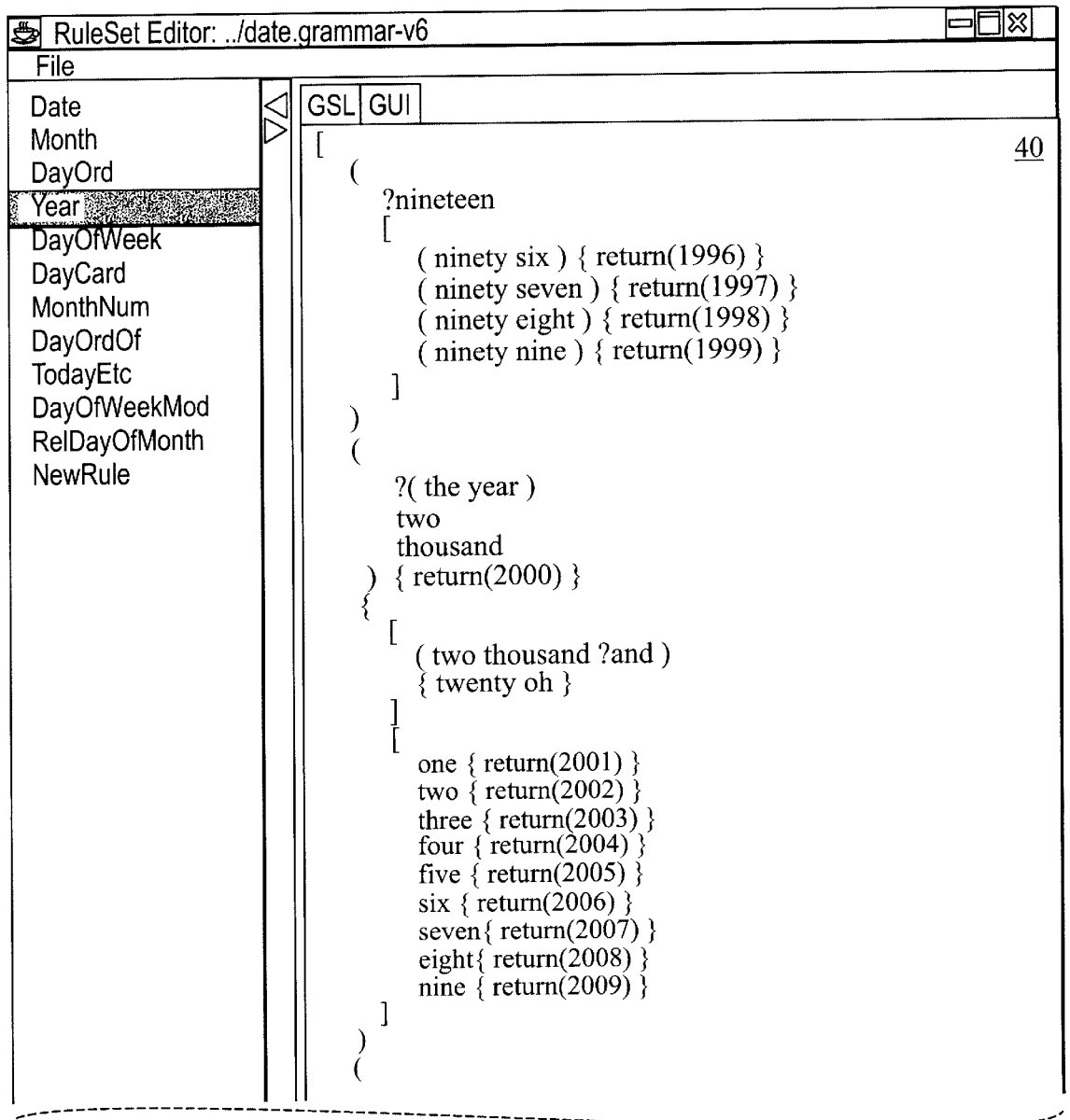
FIG. 16 shows a display in the GSL mode with an example of a GSL listing.
Figure 16:
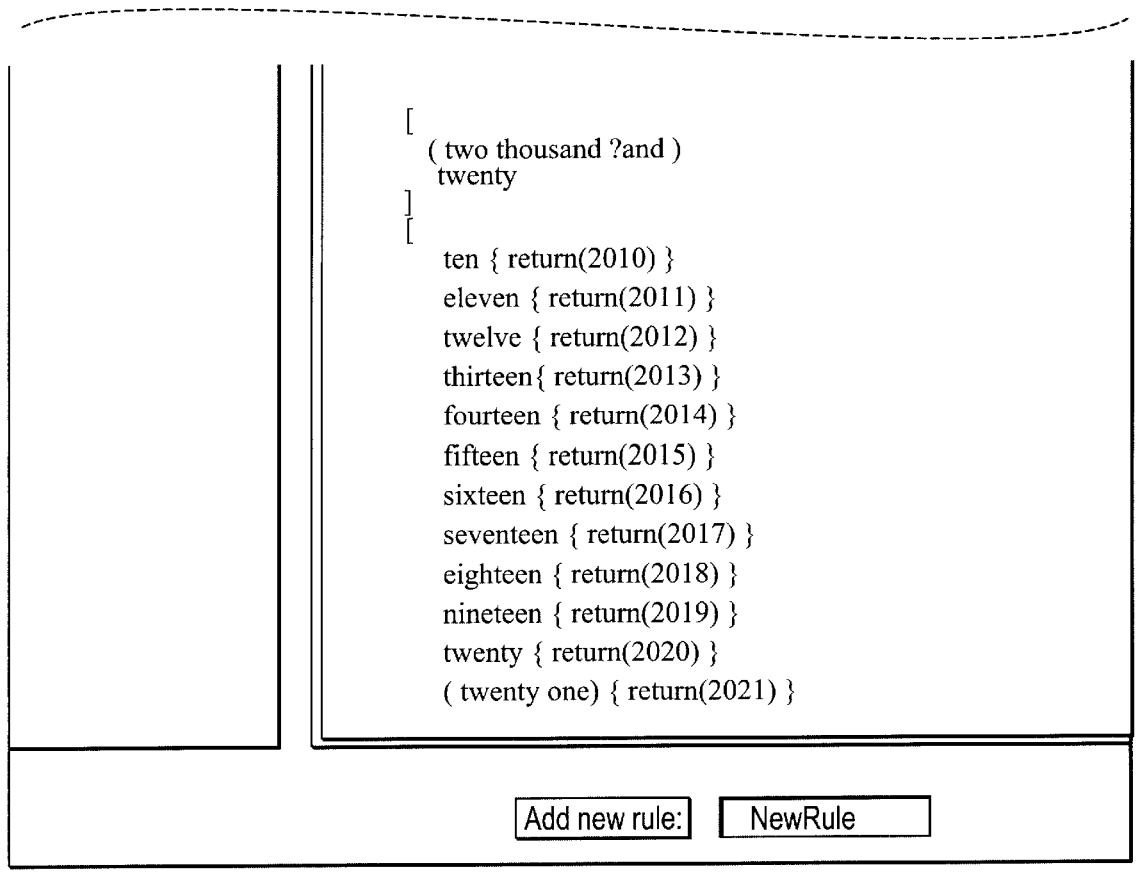
Figure 17:
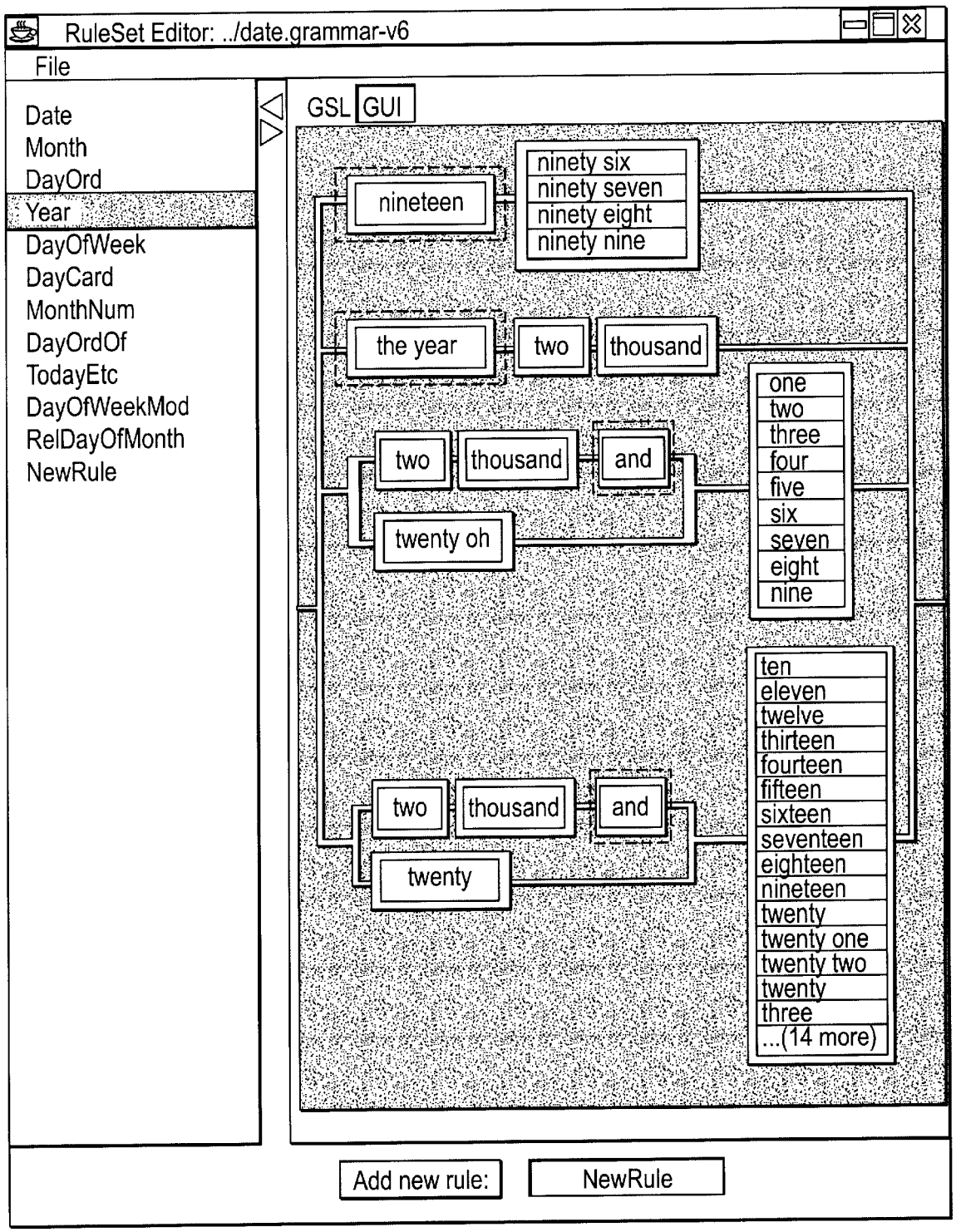
FIG. 17 shows a display in the GUI mode corresponding to the GSL listing of FIG. 16.
Figure 18:
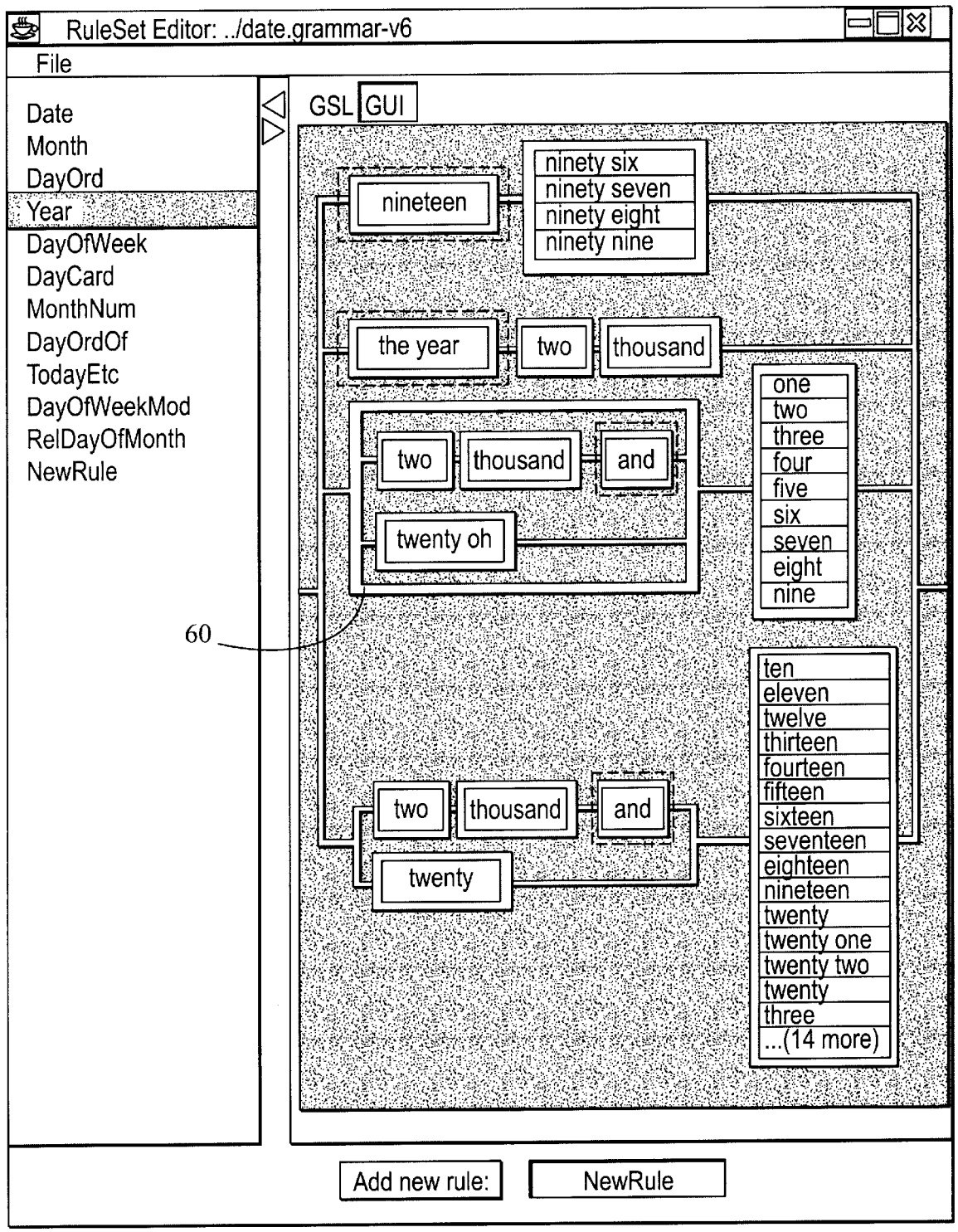
FIG. 18 shows a display in the GUI mode in which a group of objects is selected.

To further illustrate the correspondence between the GSL display and the GUI display, reference is now made to FIGS. 16 through 21. FIG. 16 illustrates an example of the GSL display containing a more complex GSL listing. A grammar for acquiring the year of a date is represented. FIG. 17 illustrates the GUI display corresponding to the GSL listing of FIG. 16. The illustrated grammar contains multiple nested levels of both alternative and mandatory expressions, as can be seen in both the GSL display and the GUI display.

Figure 19:
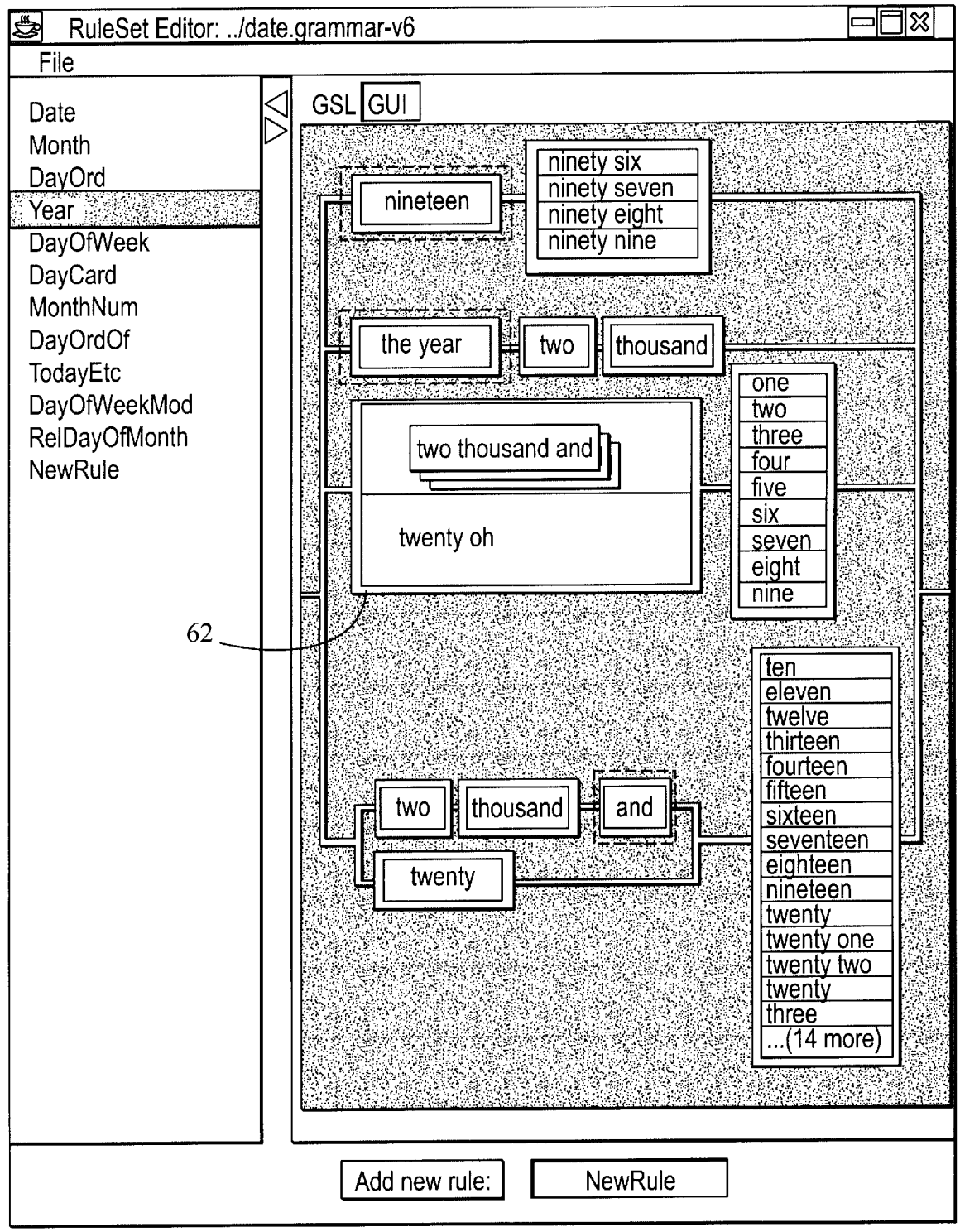
FIG. 19 shows a display in the GUI mode after the selected group of FIG. 18 has been compressed.
Figure 20:
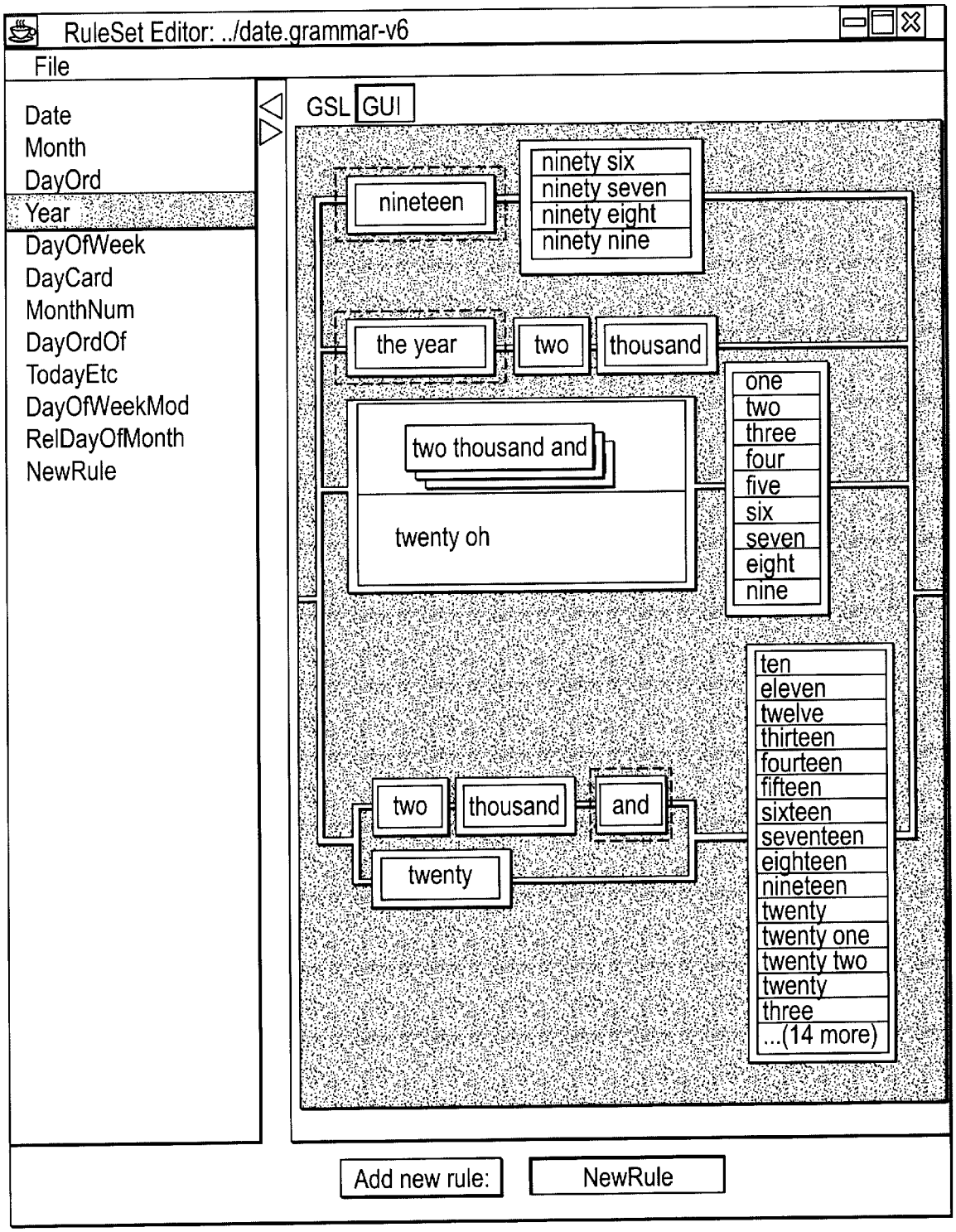
FIG. 20 shows a display in the GUI mode in which all displayed objects have been selected as a group.
Figure 21:
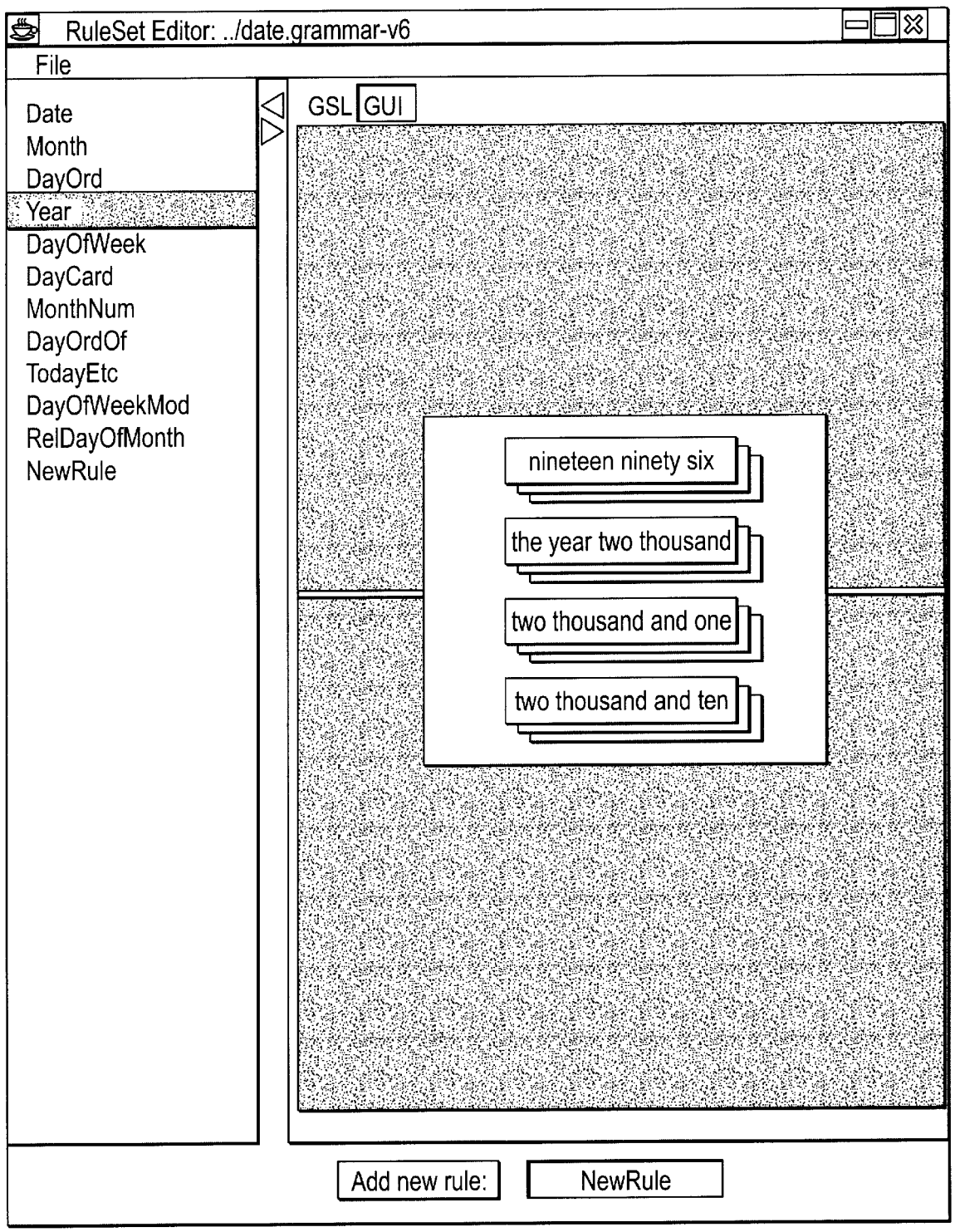
FIG. 21 shows a display in the GUI mode after the selected group of FIG. 20 has been compressed.

FIGS. 18 through 21 further illustrate the expansion and compression features described above. In the GUI mode, the user may use a pointing device to select a group of objects, such as group 60 in FIG. 18. Group 60 contains (locally) mandatory expressions, "two" and "thousand", an optional expression, "and", and alternative sets of expressions, "two thousand and" and "twenty oh". The group 60 of objects may be compressed in the manner described above, such that the group 60 is represented in the GUI display by a single object 62, as shown in FIG. 19. Similarly, the entire set of displayed objects representing the entire grammar may be selected, as shown in FIG. 20, and compressed to generate a GUI display as shown in FIG. 21.

Thus, a method and apparatus for allowing a user to create and edit grammars for speech recognition have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A computer-implemented method of providing a user interface for allowing a user to edit grammars for speech recognition, the method comprising:

operating in a first editing mode for allowing the user to enter first inputs to specify a first grammar, such that in response to the first inputs, a first set of graphical objects and a corresponding first grammar specification language (GSL) sequence representing the first grammar are generated; and operating in a second editing mode for allowing the user to enter second inputs to specify a second GSL sequence, the second GSL sequence including a second grammar, such that in response to the second inputs, a second set of graphical objects representing the second GSL sequence is generated.

2. A method as recited in claim 1, wherein each said grammar may comprise a plurality of expressions and logical relationships between the expressions.

3. A method as recited in claim 1, further comprising providing the first and second editing modes such that, in response to a user input specifying a change to the first grammar, both the first GSL sequence and the first set of graphical objects are automatically updated.

4. A method as recited in claim 1, further comprising allowing the user to select either of the first editing mode and the second editing mode.

5. A method as recited in claim 4, further comprising allowing the user to repeatedly switch between the first editing mode and the second editing mode to edit a particular grammar.

6. A computer-implemented method of providing a user interface for allowing a user to create and edit grammars for speech recognition, the method comprising:
   receiving first user inputs specifying a first grammar for speech recognition;
   in response to the first user inputs, generating a first set of graphical objects representing the first grammar and generating a corresponding first grammar specification language (GSL) sequence representing the first grammar;
   receiving second user inputs specifying a second GSL sequence representing a second grammar for speech recognition; and
   in response to the second user inputs, generating data representing a second set of graphical objects, the second of graphical objects representing the second grammar.

7. A method as recited in claim 6, wherein each said grammar may comprise a plurality of expressions and logical relationships between the expressions.

8. A computer-implemented method of providing a user interface for allowing a user to create and edit grammars for speech recognition, the method comprising:
   receiving first user inputs specifying a modification to a displayed set of graphical objects, the displayed set of graphical objects representing a grammar; and
   in response to the first user inputs, concurrently modifying the displayed set of graphical objects and a grammar specification language (GSL) sequence textually representing the grammar.

9. A method as recited in claim 8, further comprising:
   receiving second user inputs specifying a modification to the GSL sequence; and
   in response to the second user inputs, modifying the GSL sequence and the set of graphical objects.

10. A method as recited in claim 8, wherein the grammar may comprise a plurality of expressions and logical relationships between the expressions.

11. A computer-implemented method of providing a user interface for allowing a user to edit grammars for speech recognition, the method comprising:
    receiving first user inputs specifying a modification to a displayed grammar specification language (GSL) sequence, the displayed GSL sequence including a grammar; and
    in response to the first user inputs, modifying the displayed GSL sequence and data representing a set of displayable graphical objects, the displayable graphical objects representing the grammar.

12. A method as recited in claim 11, further comprising:
    receiving second user inputs specifying a modification to the GSL sequence; and
    in response to the second user inputs, modifying the GSL sequence and the set of graphical objects.

13. A method as recited in claim 11, wherein the grammar may comprise a plurality of expressions and logical relationships between the expressions.

14. A computer-implemented method of providing a user interface for allowing a user to create and edit grammars for speech recognition, the method comprising:
    receiving first user inputs specifying a first grammar;
    in response to the first user inputs, generating a first set of graphical objects representing the first grammar and generating a corresponding first grammar specification language (GSL) sequence representing the first grammar;
    displaying the first set of graphical objects;
    receiving second user inputs directed to the displayed first set of graphical objects, the second user inputs specifying a modification to the first grammar;
    in response to the second user inputs, concurrently modifying the first set of graphical objects and the first GSL sequence according to the second user inputs;
    receiving third user inputs directed to the first GSL sequence, the third user inputs specifying a modification to the first GSL sequence;
    in response to the third user inputs, concurrently modifying the first GSL sequence and the first set of graphical objects according to the third user inputs.

15. A method as recited in claim 14, wherein each said grammar comprises expressions and logical relationships between the expressions.

16. A method of operating an editor for allowing a user to create and edit grammars for speech recognition, the method comprising:
    receiving first user inputs specifying a first grammar specification language (GSL) sequence, the first GSL sequence representing a first set of expressions and logical relationships associated with the first set of expressions;
    in response to the first user inputs
       displaying the first GSL sequence, and
       defining a first set of graphical objects representing the first set of expressions and the logical relationships associated with the first set of expressions; and
       displaying the first set of graphical objects according to the logical relationships associated with the first set of expressions.

17. A method as recited in claim 16, further comprising:
    receiving second user inputs specifying a modification to the first set of graphical objects; and
    in response to the second user inputs, modifying the first GSL sequence.

18. A method as recited in claim 16, further comprising:
    receiving second user inputs specifying a modification to the first GSL sequence; and
    in response to the second user inputs, modifying the first set of graphical objects.

19. A method as recited in claim 16, further comprising:
    receiving second user inputs specifying a modification to the first set of graphical objects;
    in response to the second user inputs, modifying the first GSL sequence;
    receiving third user inputs specifying a modification to the first GSL sequence; and
    in response to the third user inputs, modifying the first set of graphical objects.

20. A computer-implemented method of operating an editor for allowing a user to create and edit grammars for speech recognition, the method comprising:
    receiving first user inputs, the first user inputs specifying a first set of expressions for speech recognition and logical relationships associated with the first set of expressions;

in response to the first user inputs
  displaying a first set of graphical objects according to the logical relationships associated with the first set of expressions, and
  generating a first grammar specification language (GSL) sequence, the first GSL sequence including the first set of expressions and the logical relationships associated with the first set of expressions;
receiving second user inputs specifying second GSL sequence, the second GSL sequence including a second set of expressions for speech recognition and logical relationships associated with the second set of expressions;
in response to the second user inputs
  displaying the second GSL sequence, and
  defining a second set of graphical objects representing the second set of expressions and the logical relationships associated with the second set of expressions;
  displaying the first GSL sequence; and
  displaying the second set of graphical objects according to the logical relationships associated with the second set of expressions.

21. A method as recited in claim 20, further comprising:
receiving third user inputs specifying a modification to the first set of graphical objects; and
in response to the third user inputs, modifying the first GSL sequence.

22. A method as recited in claim 20, further comprising:
receiving third user inputs specifying a modification to the first GSL sequence; and
in response to the third user inputs, modifying the first set of graphical objects.

23. A method as recited in claim 20, further comprising:
receiving third user inputs specifying a modification to the first set of graphical objects;
in response to the third user inputs, modifying the first GSL sequence;
receiving fourth user inputs specifying a modification to the first GSL sequence; and
in response to the fourth user inputs, modifying the first set of graphical objects.

24. A method of enabling a remote computer system to provide a user interface to allow a user to create and edit grammars for speech recognition, the method comprising transmitting to a remote computer system sequences of instructions for execution on the remote computer system, the sequences of instructions for configuring the remote computer system to perform the steps of:
  receiving first user inputs specifying a first grammar;
  generating, in response to the first user inputs, a first set of graphical objects representing the first grammar and generating a corresponding first grammar specification language (GSL) sequence representing the first grammar;
  receiving second user inputs specifying a script representing a second grammar; and
  generating, in response to the second user inputs, data representing a second set of graphical objects, the second of graphical objects representing the second grammar.

25. A method as recited in claim 24, wherein each said grammar may comprise expressions and logical relationships between the expressions.

26. A device for providing a user interface to allow a user to create and edit grammars for speech recognition, the device comprising:
  a GSL editor configured to receive user inputs specifying a listing of a first grammar specification language (GSL) sequence representing a grammar;
  a first GSL parser configured to parse the first GSL sequence according to a first GSL syntax to generate a first representation of the grammar, the first GSL parser further configured to modify the first representation in response to inputs specifying a modification to the listing;
  a first GSL generator configured to receive the representation and configured to generate the listing of the first GSL sequence based on the first representation, the first GSL generator further configured to automatically update the listing of the first GSL sequence in response to a modification to the first representation;
  a graphical object generator configured to receive the first representation and configured to generate a set of graphical objects based on the first representation, the graphical objects for graphically representing the first GSL sequence when displayed, the graphical object generator further configured to automatically update the set of graphical objects in response to a modification to the first representation; and
  a graphical editor configured to receive user inputs directed to the set of graphical objects and specifying a modification to the grammar, the first editor further configured to modify the first representation according to the user inputs.

27. A device as recited in claim 26, further comprising:
  a second GSL parser configured to parse a second GSL sequence according to a second GSL syntax to generate a second representation of a grammar, the second GSL syntax different from the first GSL syntax, the second GSL parser further configured to modify the second representation in response to inputs specifying a modification to a listing of the second GSL sequence; and
  a second GSL generator configured to receive the second representation and to generate the listing of the second GSL sequence based on the second representation, the second GSL generator further configured to automatically update the listing of the second GSL sequence in response to a modification to the second representation.

28. A method as recited in claim 27, wherein:
the second GSL generator is further configured to receive the first representation and to generate the listing of the first GSL sequence based on the first representation according to the second GSL syntax; and
the first GSL generator is further configured to receive the second representation and to generate the listing of the second GSL sequence based on the second representation according to the first GSL syntax.

29. A computer system comprising:
a processor;
a display device coupled to the processor; and
a storage device coupled to the processor and having instructions stored therein which configure the computer system for
  operating in a first editing mode for allowing the user to enter first inputs to specify a first grammar, such that in response to the first inputs, a first set of graphical objects representing the first grammar and a corresponding first grammar specification language (GSL) sequence representing the first grammar are generated; and
  operating in a second editing mode for allowing the user to enter second inputs to specify second GSL sequence, the second GSL sequence including a second grammar, such that in response to the second inputs, a second set of graphical objects representing the second GSL sequence is automatically generated.

30. A computer system as recited in claim 29, wherein each said grammar comprises expressions and logical relationships between the expressions.

31. A computer system as recited in claim 29, wherein the instructions further comprise instructions which configure the computer system for providing the first and second editing modes such that, in response to a user input specifying a change to the first grammar, both the first GSL sequence and the first set of graphical objects are automatically updated.

32. A computer system as recited in claim 29, wherein the instructions further comprise instructions which configure the computer system for allowing the user to select either of the first editing mode and the second editing mode.

33. A computer system as recited in claim 32, wherein the instructions further comprise instructions which configure the computer system for allowing the user to repeatedly switch between the first editing mode and the second editing mode to edit a particular grammar.

34. A device as recited in claim 33, wherein each said grammar comprises expressions and logical relationships between the expressions.

35. A device for providing a user interface to allow a user to create and edit grammars for speech recognition, the device comprising:
    means for receiving first user inputs specifying a first grammar;
    means for generating, in response to the first user inputs, a first set of graphical objects representing the first grammar and generating a corresponding first grammar specification language (GSL) sequence representing the first grammar;
    means for receiving second user inputs specifying a script representing a second grammar; and
    means for generating, in response to the second user inputs, data representing a second set of graphical objects, the second of graphical objects representing the second grammar.

36. A machine readable program storage medium having stored therein sequences of instructions which, when executed by a computer system, cause the computer system to:
    receive first user inputs specifying a first grammar for speech recognition;
    generate, in response to the first user inputs, a first set of graphical objects representing the first grammar and generating a corresponding first grammar specification language (GSL) sequence representing the first grammar;
    receive second user inputs specifying a script representing a second grammar for speech recognition; and
    generate, in response to the second user inputs, data representing a second set of graphical objects, the second of graphical objects representing the second grammar.

37. A machine readable program storage medium as recited in claim 36, wherein each said grammar comprises expressions and logical relationships between the expressions.

38. A computer system comprising:
    a processor;
    a display device coupled to the processor; and
    a storage device coupled to the processor and having instructions stored therein which configure the computer system for
        receiving first user inputs, the first user inputs specifying a first set of expressions and logical relationships associated with the first set of expressions;
        in response to the first user inputs
            displaying a first set of graphical objects according to the logical relationships associated with the first set of expressions, and
            generating a first grammar specification language (GSL) sequence, the first GSL sequence including the first set of expressions and the logical relationships associated with the first set of expressions;
        receiving second user inputs specifying second GSL sequence, the second GSL sequence including a second set of expressions and logical relationships associated with the second set of expressions;
        in response to the second user inputs
            displaying the second GSL sequence, and
            defining a second set of graphical objects representing the second set of expressions and the logical relationships associated with the second set of expressions;
        displaying the first GSL sequence; and
        displaying the second set of graphical objects according to the logical relationships associated with the second set of expressions.

39. A computer system as recited in claim 38, wherein the instructions further comprise instructions which configure the computer system for:
    receiving third user inputs specifying a modification to the first set of graphical objects; and
    in response to the third user inputs, modifying the first GSL sequence.

40. A computer system as recited in claim 38, wherein the instructions further comprise instructions which configure the computer system for:
    receiving third user inputs specifying a modification to the first GSL sequence; and
    in response to the third user inputs, modifying the first set of graphical objects.

41. A computer system as recited in claim 38, wherein the instructions further comprise instructions which configure the computer system for:
    receiving third user inputs specifying a modification to the first set of graphical objects;
    in response to the third user inputs, modifying the first GSL sequence;
    receiving fourth user inputs specifying a modification to the first GSL sequence; and
    in response to the fourth user inputs, modifying the first set of graphical objects.

* * * * *